United States Patent
Yamamoto et al.

(10) Patent No.: US 11,237,962 B2
(45) Date of Patent: Feb. 1, 2022

(54) COMPLEX SYSTEM AND DATA TRANSFER METHOD

(71) Applicant: Hitachi, Ltd., Tokyo (JP)

(72) Inventors: Akira Yamamoto, Tokyo (JP); Ryosuke Tatsumi, Tokyo (JP); Yoshinori Ohira, Tokyo (JP); Junji Ogawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/017,934

(22) Filed: Sep. 11, 2020

(65) Prior Publication Data
US 2021/0294742 A1 Sep. 23, 2021

(30) Foreign Application Priority Data
Mar. 18, 2020 (JP) .............................. JP2020-047216

(51) Int. Cl.
*G06F 11/00* (2006.01)
*G06F 12/00* (2006.01)
*G06F 3/00* (2006.01)
*G06F 12/0804* (2016.01)
*G06F 3/06* (2006.01)
*G06F 11/10* (2006.01)

(52) U.S. Cl.
CPC ........ *G06F 12/0804* (2013.01); *G06F 3/0604* (2013.01); *G06F 3/0655* (2013.01); *G06F 3/0689* (2013.01); *G06F 11/1076* (2013.01); *G06F 2212/60* (2013.01)

(58) Field of Classification Search
CPC .. G06F 12/0804; G06F 3/0604; G06F 3/0655; G06F 3/0689
See application file for complete search history.

(56) References Cited

U.S. PATENT DOCUMENTS

| 9,800,661 B2 | 10/2017 | Ori | |
| 2010/0235574 A1* | 9/2010 | Umezuki | G06F 11/2087 711/114 |
| 2015/0127854 A1 | 5/2015 | Yamamoto et al. | |

* cited by examiner

*Primary Examiner* — Reginald G Bragdon
*Assistant Examiner* — Michael L Westbrook
(74) *Attorney, Agent, or Firm* — Mattingly & Malur, PC

(57) ABSTRACT

In a complex system including; one or more storage systems including a cache and a storage controller; and one or more storage boxes including a storage medium, the storage box generates redundant data from write data received from a server, and writes the write data and the redundant data to the storage medium. The storage box transmits the write data to the storage system when it is difficult to generate the redundant data or it is difficult to write the write data and the redundant data to the storage medium. The storage system stores the received write data in the cache.

15 Claims, 39 Drawing Sheets

FIG. 2

| SERVER PORT IDENTIFIER | — 24000 |
| --- | --- |
| LOGICAL VOLUME IDENTIFIER | — 24001 |
| STORAGE SYSTEM IDENTIFIER | — 24002 |
| STORAGE PORT IDENTIFIER | — 24003 |
| ⋮ | |
| LOGICAL VOLUME IDENTIFIER | — 24001 |
| STORAGE SYSTEM IDENTIFIER | — 24002 |
| STORAGE PORT IDENTIFIER | — 24003 |

| VIRTUAL LOGICAL VOLUME IDENTIFIER | 2086 |
| CONTROL RIGHT INFORMATION | 2087 |
| REAL STORAGE SYSTEM IDENTIFIER | 2088 |
| STORAGE PORT IDENTIFIER | 2089 |
| SERVER PORT IDENTIFIER | 2091 |
| ⋮ | |
| SERVER PORT IDENTIFIER | 2091 |
| ⋮ | |
| STORAGE PORT IDENTIFIER | 2089 |
| SERVER PORT IDENTIFIER | 2091 |
| ⋮ | |
| SERVER PORT IDENTIFIER | 2091 |
| LOGICAL VOLUME IDENTIFIER | 2090 |

| | |
|---|---|
| LOGICAL VOLUME ID | — 2001 |
| LOGICAL CAPACITY | — 2002 |
| LOGICAL VOLUME TYPE | — 2005 |
| LOGICAL VOLUME RAID GROUP TYPE | — 2003 |
| ALLOCATION EXTENT | — 2026 |
| FIRST CACHE MANAGEMENT POINTER | — 2022 |
| ⋮ | |
| FIRST CACHE MANAGEMENT POINTER | — 2022 |
| SECOND CACHE MANAGEMENT POINTER | — 2023 |
| ⋮ | |
| SECOND CACHE MANAGEMENT POINTER | — 2023 |
| FIRST STORAGE POINTER | — 2024 |
| ⋮ | |
| SECOND STORAGE POINTER | — 2025 |
| ⋮ | |

| | |
|---|---|
| STORAGE UNIT ID | — 2510 |
| NUMBER OF CONNECTED PATHS | — 2501 |
| CONNECTION PATH IDENTIFIER | — 2502 |
| ⋮ | |
| STORAGE TYPE | — 2503 |
| CAPACITY | — 2504 |
| NUMBER OF TEMPORAL WRITING AREA | — 2505 |
| TEMPORAL WRITING AREA ADDRESS | — 2506 |
| ⋮ | |
| USING FLAG | — 2507 |
| ⋮ | |

| | |
|---|---|
| LOGICAL VOLUME ID | — 2001 |
| LOGICAL CAPACITY | — 2002 |
| LOGICAL VOLUME TYPE | — 2005 |
| LOGICAL VOLUME RAID GROUP TYPE | — 2003 |
| FIRST CACHE MANAGEMENT POINTER ⋮ | — 2022 |
| SECOND CACHE MANAGEMENT POINTER ⋮ | — 2023 |
| MAPPING INFORMATION | — 2004 |
| DATA LENGTH AFTER COMPRESSION | — 2018 |
| HASH VALUE | — 2019 |
| LOG STRUCTURED POINTER | — 2005 |
| LOG STRUCTURE WRITING POINTER | — 2006 |
| FIRST/SECOND DATA STORE AREA POINTER BEFORE COMPRESS ⋮ | — 2007, 2008 |
| FIRST/SECOND DATA STORE AREA POINTER AFTER COMPRESS ⋮ | — 2009, 2010 |
| FIRST/SECOND INVALID BIT MAP BEFORE COMPRESS ⋮ | — 2020, 2021 |
| FIRST/SECOND INVALID BIT MAP AFTER COMPRESS ⋮ | — 2011, 2012 |
| FIRST/SECOND WRITING POINTER BEFORE COMPRESS ⋮ | — 2013, 2014 |
| FIRST/SECOND WRITING POINTER AFTER COMPRESS ⋮ | — 2015, 2016 |
| LOGICAL VOLUME DIRECT TRANSFER STOP FLAG | — 2030 |

2000

2300

2100

COMPLEX SYSTEM AND DATA TRANSFER METHOD

CROSS-REFERENCE TO RELATED APPLICATION

The present application claims priority from Japanese application JP 2020-047216, filed on Mar. 18, 2020, the contents of which is hereby incorporated by reference into this application.

BACKGROUND OF THE INVENTION

1. Field of the Invention

The present invention relates to improvement in performance and improvement in reliability of a scale-out type storage system write process using a flash memory or a magnetic disk as a storage (storage medium).

2. Description of the Related Art

In recent years, non-volatile memory express (NVMe), which is a communication protocol optimized for flash storage using a non-volatile memory such as an SSD, is used to achieve a significant increase in processing speed of a storage system. In such a storage system, it is considered that a storage controller becomes a bottleneck in terms of performance. Therefore, it is considered to eliminate the performance bottleneck of the storage controller and realize high-speed data transfer by directly connecting a host computer to a drive box connected to the storage system by a fabric network (NVMeoF: NVMe over Fabric) and directly transferring data between the host computer and the drive box without the intervention of the storage system.

(Problems in Realizing Direct Data Transfer)

There are the following two problems in realizing direct data transfer.

(Problem 1) Regarding a logical volume provided by a storage system, an address space seen from a host computer and an address space of a drive in FBOF are different, and it is difficult for the host computer to identify any address of the drive in the FBOF where desired data is stored.

(Problem 2) In the case of improving the performance of data access using a cache of the storage system, it is necessary to read the data from the cache of the storage when there is new data in the cache, but it is difficult for the host computer to determine the presence or absence of the new data.

For such problems, there is disclosed an invention in which agent software running on a host computer queries a storage controller for a drive and its address in FBOF corresponding to access destination data of the host computer, and the drive in the FBOF is directly accessed on the basis of obtained information.

In the invention disclosed in U.S. Pat. No. 9,800,661, a host computer can directly access a drive of FBOF, but agent software needs to perform calculation for protection of data such as RAID, and there is a problem that a calculation load is applied to the host computer to perform highly reliable processing.

SUMMARY OF THE INVENTION

In the invention disclosed in U.S. Pat. No. 9,800,661, a host computer can directly access a drive of FBOF, but agent software needs to perform calculation for protection of data such as RAID, and there is a problem that a calculation load is applied to the host computer to perform highly reliable processing.

When executing a write process of directly transferring data from a server to a storage box, it is necessary to solve the following three problems.

First, in the conventional write process, an end report is sent to a server at a stage where data received from the server is written in a cache of a storage control unit. Even in the present invention, it is necessary to complete the write process in the same time as the time required for the conventional write process from the viewpoint of the server.

A second problem is creation of redundant data. After receiving data, a conventional storage control unit generates redundant data from the received data and stores the received data and the redundant data in a storage unit. Even if one storage unit fails, the conventional storage control unit has a function of restoring data of the failed storage unit from the data and redundant data of another storage unit. A cache is equipped with a battery or the like to prevent the storage control unit from losing the received data until the received data and redundant data are stored in the storage unit, and data is also duplicated and stored in the cache. In the present invention, a storage control unit does not receive data, and thus, how to create redundant data while avoiding the loss of data is a problem.

A third problem is how to respond when a failure occurs. The storage control unit needs to responsibly store data whose completion has been reported to the server. Therefore, it is necessary to suppress the loss of data and the like as much as possible even if a failure occurs, and thus, the storage control unit has an enormous amount of logic to prevent these. If there is an attempt to develop a similar logic in the storage box, the labor and effort for the development become enormous, which is not practical.

The present invention aims to provide a complex system and a data transfer method, which solve a problem at the time of directly transferring data from a server to a storage box in a write process, in a configuration in which a plurality of servers, a plurality of storage systems, and the storage box storing a storage unit such as a flash memory and a magnetic disk are shared via a network.

According to one aspect of the present invention that solves the above problems, a complex system includes; one or more storage systems including a cache and a storage controller; and one or more storage boxes including a storage medium. The storage box generates redundant data from write data received from a server, and writes the write data and the redundant data to the storage medium. The storage box transmits the write data to the storage system when it is difficult to generate the redundant data or it is difficult to write the write data and the redundant data to the storage medium. The storage system stores the received write data in the cache.

According to the present invention, when executing the write process in the configuration in which the plurality of servers, the plurality of storage systems, and the storage box storing the storage unit such as the flash memory and the magnetic disk are shared in the network, the data transmitted from the server is directly received by the storage box according to an instruction of a storage control unit, so that a load on the network can be reduced.

BRIEF DESCRIPTION OF THE DRAWINGS

FIG. 2 is a view illustrating a configuration of server port information according to the first embodiment;

FIG. 8 is a view illustrating a format of virtual logical volume information according to the first embodiment;

FIG. 9 is a view illustrating a format of logical volume information according to the first embodiment;

FIG. 14 is a view illustrating a format of storage unit information according to the first embodiment;

FIG. 26 is a diagram illustrating a format of logical volume information according to the second embodiment;

DESCRIPTION OF THE PREFERRED EMBODIMENTS

First Embodiment

<Outline of Invention>

Figure 1:
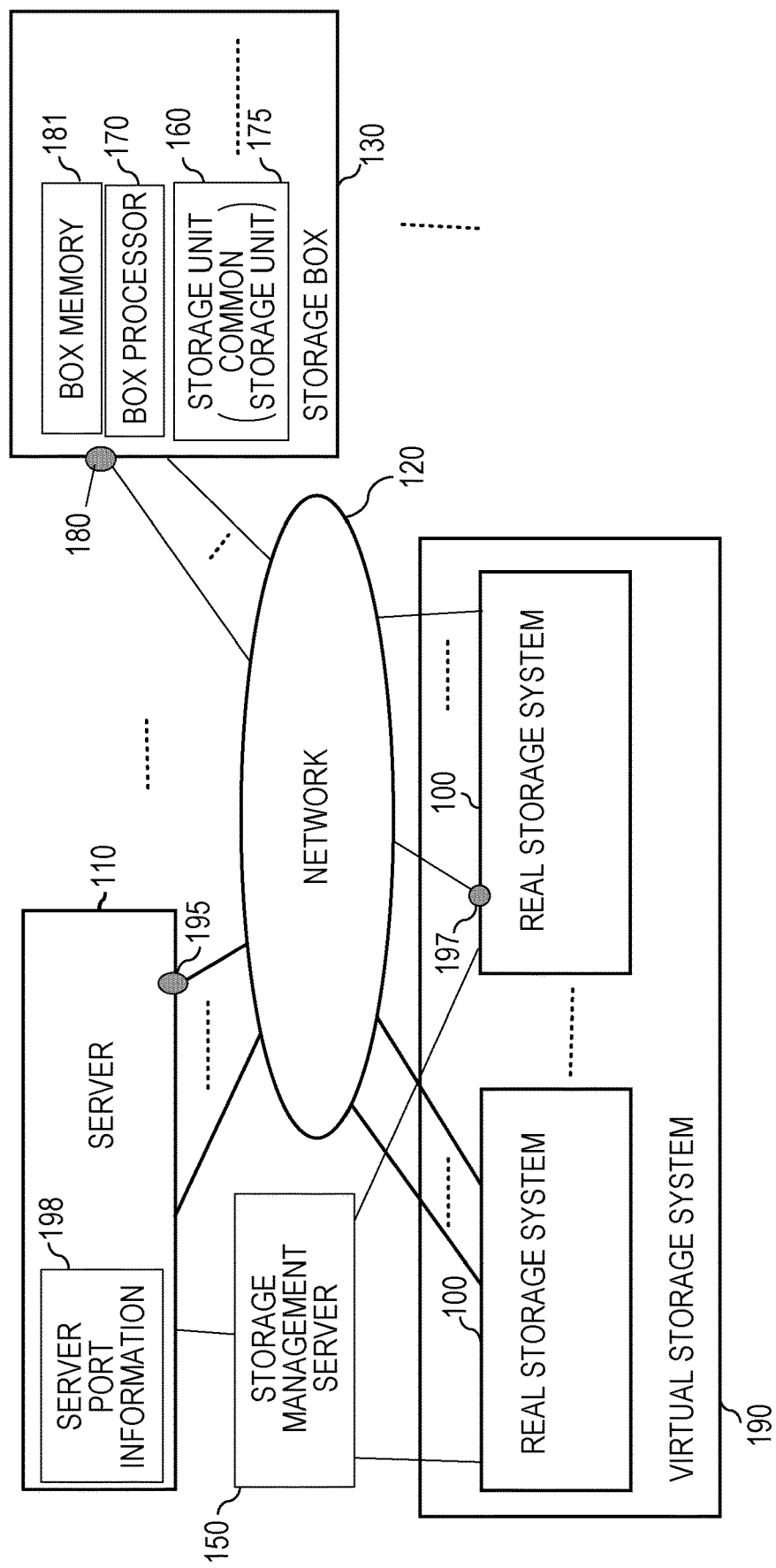
FIG. 1 is a block diagram illustrating a configuration of an information system according to a first embodiment.

When executing a write process of directly transferring data from a server to a storage box, it is necessary to solve the following three problems.

First, in the conventional write process, an end report is sent to a server at a stage where data received from the server is written in a cache of a storage control unit. Even in the present invention, it is necessary to complete the write process in the same time as the time required for the conventional write process from the viewpoint of the server.

A second problem is creation of redundant data. After receiving data, a conventional storage control unit generates redundant data from the received data and stores the received data and the redundant data in a storage unit. Even if one storage unit fails, the conventional storage control unit has a function of restoring data of the failed storage unit from the data and redundant data of another storage unit. A cache is equipped with a battery or the like to prevent the storage control unit from losing the received data until the received data and redundant data are stored in the storage unit, and data is also duplicated and stored in the cache. In the present invention, a storage control unit does not receive data, and thus, how to create redundant data while avoiding the loss of data is a problem.

A third problem is how to respond when a failure occurs. The storage control unit needs to responsibly store data whose completion has been reported to the server. Therefore, it is necessary to suppress the loss of data and the like as much as possible even if a failure occurs, and thus, the storage control unit has an enormous amount of logic to prevent these. If there is an attempt to develop a similar logic in the storage box, the labor and effort for the development become enormous, which is not practical.

In the present invention, basically, the storage control unit and the storage box share functions to solve these problems.

A method for solving the first and second problems will be described. In the present invention, data does not pass through the storage control unit, and thus, the storage box generates redundant data as in the storage control unit. The redundant data is generated mainly using a method of duplicating data and a method of generating redundant data from a plurality of pieces of data and restoring lost data from the other data and redundant data. The latter method will be described in detail. In the latter method, a method of generating redundant data will be described. A set of a plurality of pieces of data that generates redundant data is referred to as a parity group. A first method is a method of generating redundant data from the entire data when the data of the entire parity group is written. The other method is applied when a relatively small amount of data is written. Since the present invention aims to reduce a load on a network, the former is assumed and data is directly transferred to a storage box. In other words, adopted is a method of generating an updated parity from a value before the update and a value after the update of the data, and the redundant data before the update.

An access pattern for updating the data of the entire parity group is a sequential write for updating data in the order of address. The entire parity group is not updated by performing the sequential write once. It is difficult to generate the redundant data until the data of the entire parity group is available. In the meantime, the storage box temporarily writes received data doubly in a storage unit in the box so as to prevent the loss of the data received by the storage box in the present invention. The storage box completes the write process with the end of write of the data doubly in the storage unit. As a result, it is possible to complete the write process from the viewpoint of the server in the same time as that in the conventional storage control unit, which is the first problem.

When the data of the entire parity group is written doubly in the storage unit, the storage box generates redundant data, and the data of the entire parity group and the redundant data are written in an area in the storage box where data needs to be originally written. Thereafter, an area where the data has been temporarily written in a duplicated manner is released. Until the data of the entire parity group and the redundant data are written, the data is written doubly in another area, and thus, it is possible to solve the second problem of generating the redundant data while avoiding the data loss.

A solution to the third problem will be described. The storage control unit executes the processing when the failure or the like occurs in a state where the write data is duplicated and held in the cache. Therefore, in the present invention, if any failure occurs before writing the data of the entire parity group and the redundant data, the storage box transfers data that has been previously received to the storage control unit, and the storage control unit stores this data doubly in the cache. In this state, it is possible to directly apply the logic for corresponding to the failure that the storage control unit has conventionally, and thus, the third problem can be solved.

FIG. 1 illustrates a configuration of an information system according to a first embodiment. The information system includes one or more storage boxes 130, one or more real storage systems 100, one or more servers 110, a network 120 that connects the real storage system 100, the server 110, and the storage box 130, and a storage management server 150.

The server 110, the real storage system 100, and the storage box 130 are connected to the network 120 via one or more server ports 195, one or more storage ports (storage paths) 197, and a box port 180, respectively.

The server 110 has server port information 198 therein. The server 110 is a system in which a user application operates, and issues a data read/write request to the real storage system 100 via the network 120. The real storage system 100 sends a request to the storage box 130 storing data specified by the read/write request received from the server 110 via the network 120.

The real storage systems 100 also perform transmission and reception of data with each other via the network 120. The network 120 can use a protocol, for example, NVM-e over Ethernet or the like. In the first embodiment, there is a virtual storage system 190 constituted by one or more real storage systems 100. The virtual storage system 190 is regarded as one storage system by the server 110. However, the present embodiment is also advantageous when the virtual storage system 190 does not exist. When the virtual storage system 190 does not exist, the real storage system 100 is regarded as a storage system by the server 110.

The storage box 130 includes: a storage unit 160 (common storage unit 175) such as a hard disk drive (HDD) and a flash storage that uses a flash memory as a storage medium; the one or more box ports 180 for connection with the network 120; one or more box processors 170 that perform transfer with respect to the storage unit 160 according to an instruction of the real storage system 100; and a box memory 181 used by the box processor 170. Further, it is assumed that one storage unit 160 is connected to the one or more storage paths 197.

There are several types of flash storage including SLC with high price, high performance, and a large number of erasable times, and MLC with low price, low performance, and a small number of erasable times. The flash storage may include a new storage medium such as a phase change memory.

In the first embodiment, the storage unit 160 in the storage box 130 is common among the plurality of real storage systems 100. Therefore, the storage unit 160 in the storage box 130 is referred to as the common storage unit 175 in the first embodiment.

The real storage system 100 and the storage box 130 are connected to one or more real storage systems 100 in the virtual storage system 190 via the network 120. The storage box 130 is not necessarily connected to all the real storage systems 100 in the virtual storage system 190. Similarly, it is unnecessary for a set of the storage boxes 130 connected to one real storage system 100 and a set of the storage boxes 130 connected to another real storage system 100 to be exactly the same. The storage box 130 is shared by some of the real storage systems 100 via the network 120.

The storage management server 150 is connected to the real storage system 100 via the network 120 or the like, and is a device that is used by a storage manager to manage the real storage system 100 and the storage box 130. In the first embodiment, the real storage system 100 does not have a capacity virtualization function. However, the first embodiment is advantageous even when the real storage system 100 has the capacity virtualization function.

FIG. 2 illustrates a format of the server port information 198. The server port information 198 is information held for each of the server ports 195. When issuing a read/write request to the real storage system 100, the server 110 sets a storage system identifier, a logical volume identifier, and an identifier of the storage port (storage path 197). Therefore, the server port information 198 includes a server port identifier 24000, one or more logical volume identifiers 24001 accessed from the server port 195, a storage system identifier 24002 including this logical volume, and a storage port identifier 24003. When the logical volume is connected to a plurality of the storage paths 197, a plurality of the storage port identifiers (storage path identifiers) 24003 are set. In the first embodiment, an identifier of the virtual storage system 190 is set as the storage system identifier 24002. However, the present invention is advantageous even in the case where the virtual storage system 190 does not exist, and an identifier of the real storage system 100 is set as the storage system identifier 24002 in such a case. The identifier of the storage path 197 is set as the storage port identifier 24003.

In the first embodiment, a virtual logical volume identifier is set as the logical volume identifier 24001. The virtual logical volume identifier is a unique value within the virtual storage system 190. Meanwhile, each of the real storage systems 100 also has a logical volume. The logical volume identifier is unique within the real storage system 100. The read/write request of the server 110 includes a virtual storage system identifier, the virtual logical volume identifier, and the identifier of the storage path 197. Since the identifier of the storage path 197 is a real value, the real storage system 100 that receives this request is determined. The present invention is advantageous even in the case where the virtual storage system 190 does not exist, and a logical volume identifier of the real storage system 100 is set as the logical volume identifier 24001 in such a case. Further, the real storage system 100 that reads and writes the virtual logical volume is changed in the first embodiment. Even in such a case, the virtual logical volume identifier is not changed, and the connected storage path 197 is changed.

Figure 3:
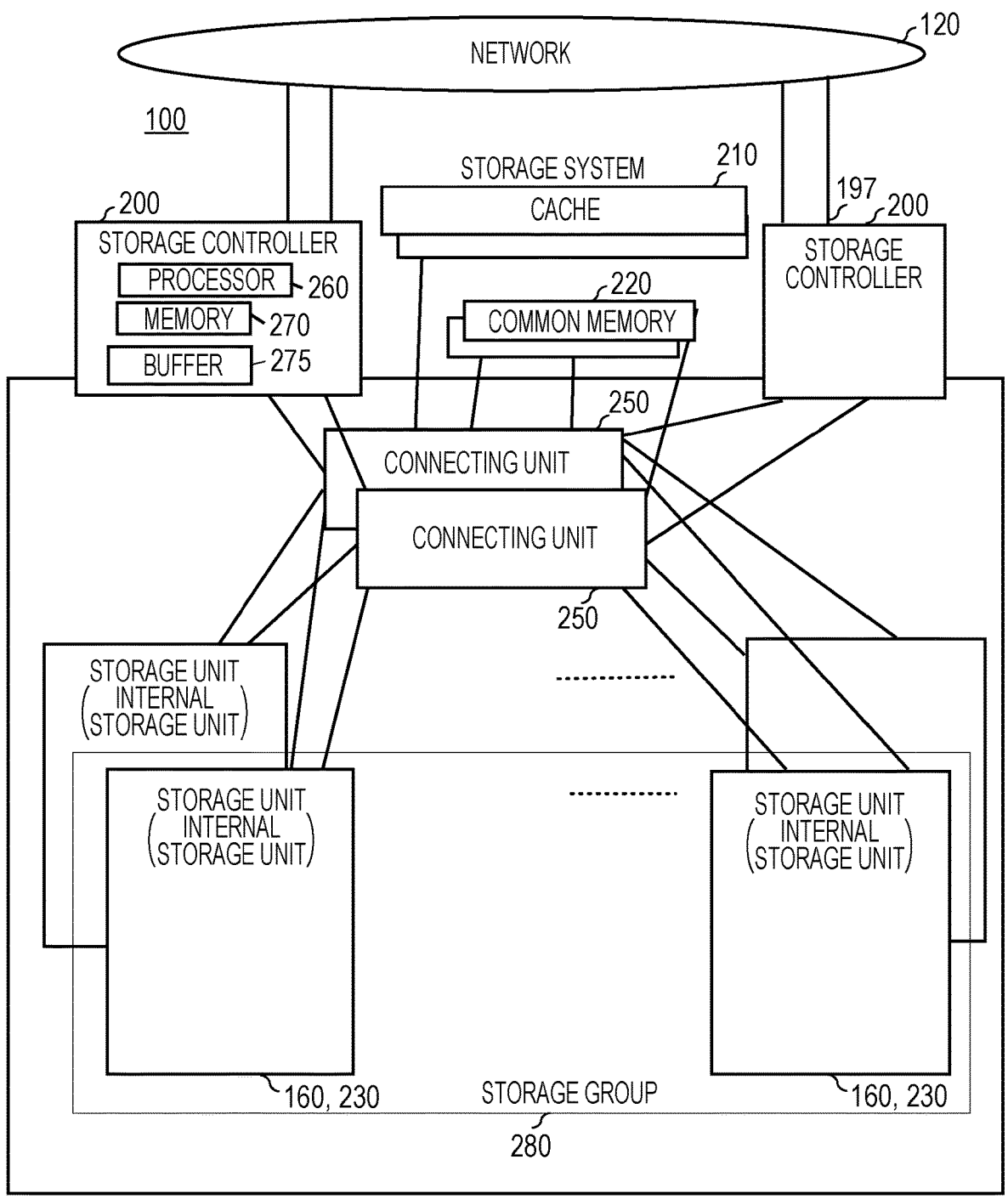
FIG. 3 is a diagram illustrating a configuration of a real storage system according to the first embodiment.

FIG. 3 illustrates a configuration of the real storage system 100. The real storage system 100 includes one or more storage controllers 200, a cache 210, a common memory 220, a storage unit 160 (internal storage unit 230), one or more connecting units 250 that connect these components, and the storage port 197 which is an interface with the network 120.

The internal storage unit 230 included in the real storage system 100 and the storage unit 160 included in the storage box 130 are also devices storing data. In particular, the storage unit 160 included in the real storage system 100 and the storage unit 160 in the storage box 130 are referred to as the internal storage unit 230 and the common storage 175, respectively, in the first embodiment. However, an object of the present invention is the storage unit in the storage box 130, and thus, the storage unit 160 basically refers to the common storage 175. In the present invention, the storage system 100 does not necessarily have the internal storage unit 230. Since the present invention relates to a complex storage system constituted by the one or more storage boxes 130 shared by the plurality of real storage systems 100, processing executed on the internal storage unit 230 by the storage controller 200, information held in the common memory 220, and the like will not be described.

The storage controller 200 includes a processor 260 that processes a read/write request issued from the server 110, a memory 270 that stores a program and information, and a buffer 275. In particular, in the present invention, the buffer 275 (1) stores information necessary for generation and generated redundant data at the time of generating the to be redundant data described later, and thus, (2) is used as a temporary storage area at the time of writing data stored in a cache area of the real storage system 100 to the storage unit 160 that permanently stores the data.

The connecting unit 250 is a mechanism that connects the respective components in the real storage system 100. A feature of the present invention is that one or more storage boxes 130 are connected via the connecting unit 250. As a result, the storage controller 200 can perform read and write with respect to the storage unit 160 in the storage box 130. In the first embodiment, it is assumed that the one or more storage controllers 200 in the real storage system 100 are connected to the storage box 130.

The cache 210 and the common memory 220 are generally configured using a volatile memory such as a DRAM, but are made non-volatile using a battery or the like. In the first embodiment, it is assumed that each of the cache 210 and the common memory 220 is duplicated in order to improve reliability. However, the present invention is advantageous even if the cache 210 or the common memory 220 is neither non-volatile nor duplicated. Further, the cache 210 and the common memory 220 are provided outside the storage controller 200 in the first embodiment, but may be configured on the memory 270 inside the storage controller 200.

Among pieces of data stored in the internal storage unit 230 and the storage unit 160 in the storage box 130, data that is frequently accessed by the storage controller 200 is stored in the cache 210.

The storage controller 200 receives a read/write request from the server 110. In general, data received to be written to the storage unit 160 is written to the cache 210, and this data is written to the storage unit 160 of the storage box 130 after the completion of the corresponding write request in many cases. In such a method, however, the data passes through the network 120 twice, so that a load on the network 120 is great.

In the present invention, the load on the network 120 is reduced by transferring the data to be written directly from the server 110 to the storage box 130.

Figure 4:
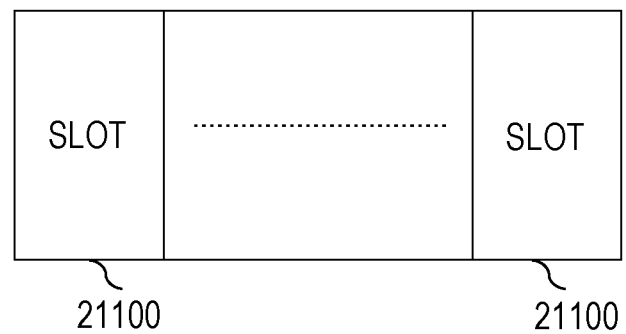
FIG. 4 is a view illustrating a configuration of a cache according to the first embodiment.

FIG. 4 represents a configuration of the cache 210. The cache 210 is divided into slots 21100 having a fixed length. The slot 21100 serves as an allocation unit of read/write data.

In the first embodiment, it is assumed to have a redundancy array independent device (RAID) function that can recover data of a unit even if the unit as one of the storage units 160 of the real storage system 100 fails. With the RAID function, a plurality of storage units of the same type adopt one RAID configuration. This is referred to as a storage group 280 (see FIG. 3).

In the first embodiment, the RAID configuration includes a set of the common storages 175 in one storage box 130 or a set of the internal storage units 230 in one real storage system 100. There are several types of RAID. For example, RAID1 writes data in a duplicated manner. RAID4 and RAID5 generate a parity (hereinafter, parity) from a plurality of pieces of data. The RAID type is determined for each storage unit group. In the first embodiment, the RAID type is RAID5. It is a matter of course that the present invention is also advantageous for RAID types other than RAID5.

In the present invention, the storage box 130 receives data directly from the server 110 and data does not pass through the storage control unit, and thus, the storage box 130 generates a parity.

A method of generating a parity in RAID5 will be described. A set of a plurality of pieces of data that generate a parity is referred to as a parity group.

A first method is a method of generating redundant data from the entire data when the data of the entire parity group is written. The other method is applied when a relatively small amount of data is written. Since the present invention aims to reduce a load on a network, the former is assumed and data is directly transferred to a storage box.

An access pattern for updating the data of the entire parity group is a sequential write for updating data in the order of address. The entire parity group is not updated by performing the sequential write once. It is difficult to generate the parity until data of the entire parity group is available. In the meantime, the storage box 130 temporarily writes received data doubly in the storage unit 160 in the box so as to prevent the loss of the data received by the storage box 130 in the first embodiment. Meanwhile, the present invention is advantageous even if the storage box 130 holds a non-volatile cache in addition to the storage unit 160 and writes the received data doubly in this cache similarly to the storage controller 200. The present invention is advantageous whether a storage medium of the cache is a DRAM backed up with a battery or a new non-volatile semiconductor memory. The storage box 130 completes a write process with the end of write of the data doubly in the storage unit 160.

When the data of the entire parity group is written doubly in the storage unit 160, the storage box 130 generates the parity, and the data of the entire parity group and the parity are written in an area in the storage box 130 where data needs to be originally written (area for which the server has instructed write). Thereafter, an area where the data has been temporarily written in a duplicated manner is released.

Until the data of the entire parity group and the parity are written, the data is written doubly in another area, and thus, the parity can be generated while avoiding the data loss. Meanwhile, the present invention is advantageous even if the storage box 130 generates a parity and writes the parity when one of data to be written doubly is written in the area where data needs to be originally written (area for which the server has instructed write) and the data of the entire parity group is written doubly.

The storage controller 200 executes the processing when a failure or the like occurs in a state where write data is duplicated and held in the cache 210. Therefore, in the present invention, if any failure occurs before writing the data of the entire parity group and the parity, the storage box 130 transfers data that has been previously received to the storage controller 200, and the storage controller 200 stores this data doubly in the cache 210. In this state, it is possible to directly apply the logic for corresponding to the failure that the storage controller 200 has conventionally.

Figure 5:
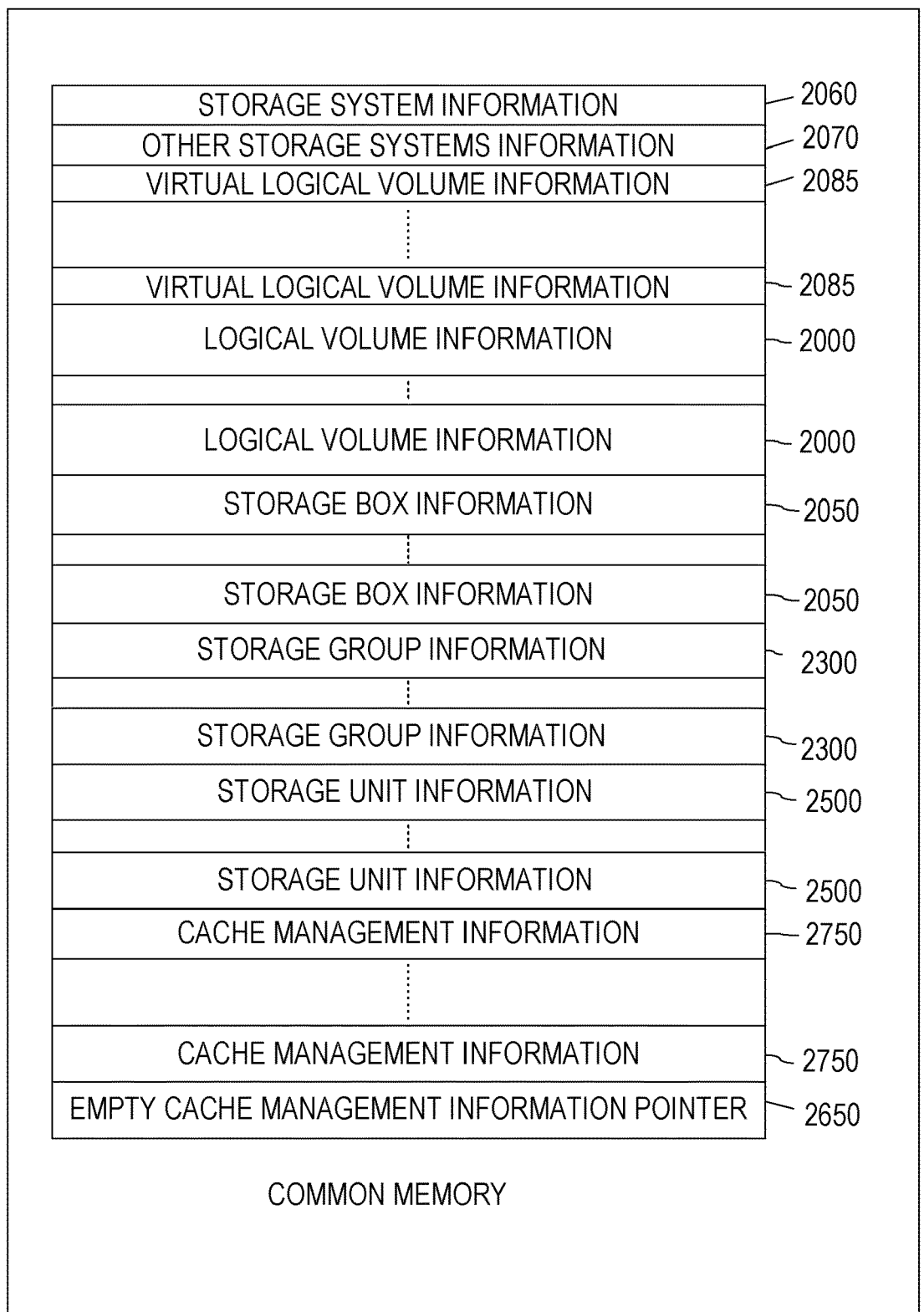
FIG. 5 is a view illustrating information stored in a common memory of the storage system according to the first embodiment.

FIG. 5 illustrates information related to the first embodiment in the common memory 220 of the real storage system 100 according to the first embodiment. The common memory 220 includes storage system information 2060, other storage systems information 2070, virtual logical volume information 2085, logical volume information 2000, storage box information 2050, storage group information 2300, storage unit information 2500, cache management information 2750, and an empty cache management information pointer (queue) 2650.

Figure 6:
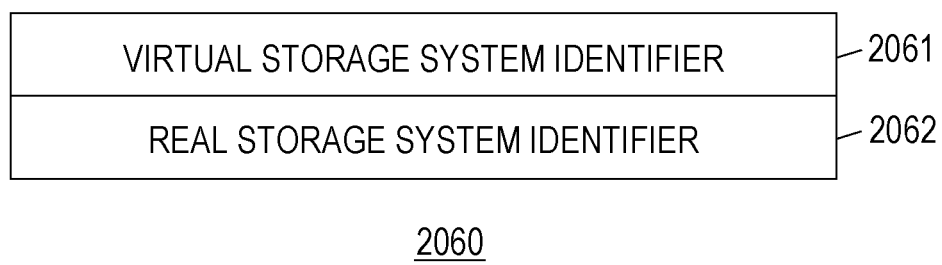
FIG. 6 is a view illustrating virtual storage system information according to the first embodiment.

Among them, the storage system information 2060 is information regarding the real storage system 100 as illustrated in FIG. 6, and includes a virtual storage system identifier 2061 and a real storage system identifier 2062 in the first embodiment. The virtual storage system identifier 2061 is an identifier of the virtual storage system 190 included in the real storage system 100. The real storage system identifier 2062 is an identifier of the real storage system 100.

Figure 7:
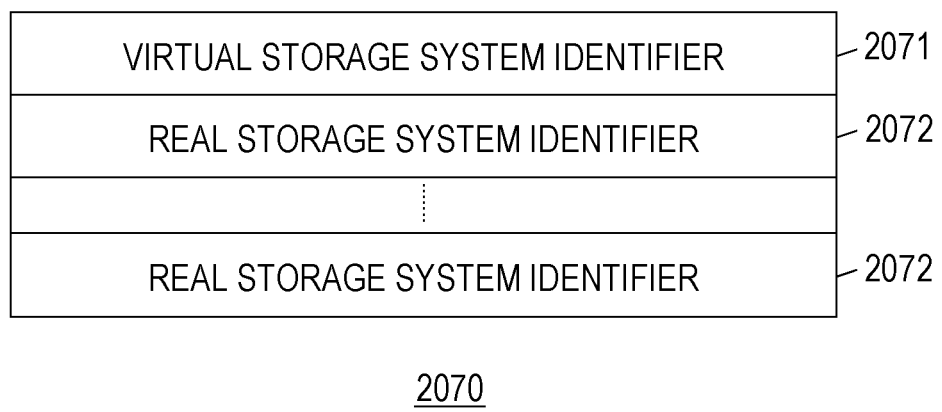
FIG. 7 is a view illustrating a format of information of other storage systems according to the first embodiment.

FIG. 7 is a view illustrating information regarding the other storage systems information 2070, and includes a virtual storage system identifier 2071 and another real storage system identifier 2072. The virtual storage system identifier 2071 is the same as the virtual storage system identifier 2051 included in FIG. 6, and is an identifier of the virtual storage system 190 included in the real storage system 100. The other real storage system identifier 2072 is an identifier of another real storage system included in the virtual storage system 190 that includes the real storage system 100.

FIG. 8 is a view illustrating information regarding the virtual logical volume information 2085. The virtual logical volume information 2085 created corresponding to the logical volume includes a virtual logical volume identifier 2086, control right information 2087, real storage system information 2088, storage port identifier (storage path identifier) 2089, server port identifier 2091, logical volume identifier 2090, and the like.

The virtual logical volume identifier 2086 is an identifier of the virtual logical volume. In the first embodiment, the virtual logical volume has a right to perform read/write by any one of the real storage systems 100. The control right information 2087 indicates whether the real storage system 100 has the control right or not. If there is no control right, any real storage system 100 having the control right and one or more storage paths 197 to which the virtual logical volume is connected are illustrated in the real storage system information 2088 and the storage path identifier 2089.

The logical volume identifier 2090 stores an identifier of a corresponding logical volume in the real storage system 100 or stores an identifier of a corresponding logical volume in the real storage system 100 that has the control right.

FIG. 9 is a view illustrating information regarding the logical volume information 2000 related to the present invention. In the first embodiment, the storage unit 160 from and to which the server 110 reads and writes data is a virtual logical volume. Further, the server 110 issues a read request or a write request by specifying an ID of the virtual logical volume, an address within the virtual logical volume, and a length of the data to be read/written. When receiving the read/write request from the server 110, the real storage system 100 recognizes an identifier of a corresponding logical volume from the virtual logical volume information 2085. In the first embodiment, the logical volume identifier is unique information within the real storage system 100. The logical volume information 2000 is information that exists for each logical volume. This information includes a logical volume identifier 2001, a logical capacity 2002, a logical volume type 2005, a logical volume RAID group type 2003, an allocation extent 2026, a first cache management information pointer 2022, a second cache management information pointer 2023, a first storage pointer 2024, a second storage pointer 2025, and the like.

The logical volume identifier 2001 indicates the ID of the corresponding logical volume. The logical capacity 2002 is the capacity of this logical volume. The logical volume type 2005 represents a type of the logical volume. In the first embodiment, the logical volume type 2005 indicates whether the logical volume is stored in the internal storage unit 230 or the common storage unit 175. The logical volume RAID group type 2003 specifies the RAID type, such as RAID0 and RAID1 of the corresponding logical volume. When redundant data of the capacity of one unit is stored with respect to the capacity of N units as in RAID5, a specific numerical value of N is specified. However, it is difficult to say that an arbitrary RAID type can be specified, and a RAID type of at least one storage group needs to be specified. The allocation extent 2026 indicates an identifier of a storage group allocated to the logical volume and a segment number that is the smallest number. In a segment bit map, the segment with the smallest number is set to 1 bit first, and each subsequent segment represents whether being allocated to the logical volume or not.

The first cache management information pointer 2022 represents whether each area, obtained by dividing the logical volume by the capacity corresponding to the slot 21100, is allocated to the slot 21100 (stored in the cache 210). If allocated, the corresponding cache management information 2750 is pointed to. If not allocated, a null state is set. In the first embodiment, data that has not been written in the storage unit 160 is duplicated and stored in the cache 210 for high reliability. Therefore, the second cache management information pointer 2023 is a pointer to the cache management information 2750 that doubly stores the unwritten data.

The first storage pointer 2024 and the second storage pointer 2025 indicate addresses of areas secured in order to write data doubly in the storage unit 160 temporarily, each area obtained by dividing the logical volume by the capacity corresponding to the parity group is (when write data is directly transferred to the storage box 130). The address indicates an identifier of the storage box 130, an identifier of the storage unit 160, and an address of the storage unit 160.

Figure 10:
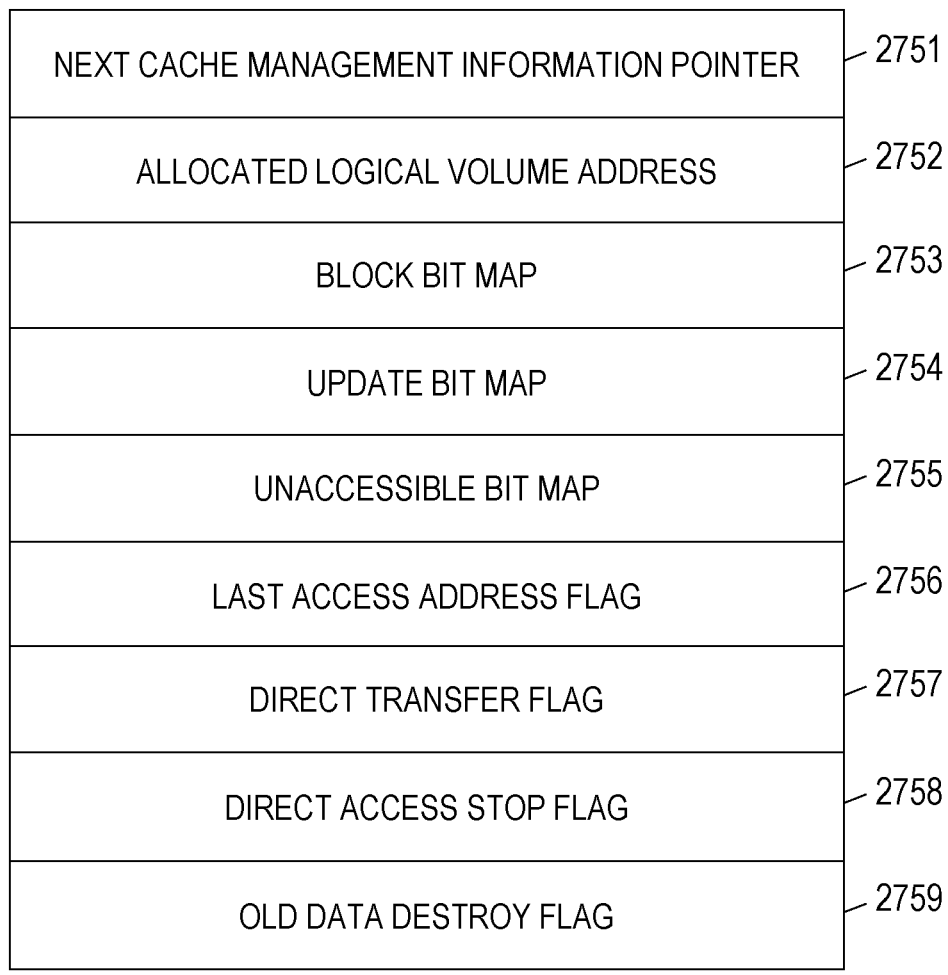
FIG. 10 is a view illustrating a format of cache management information according to the first embodiment.

FIG. 10 illustrates a configuration of the cache management information 2750. The cache management information 2750 is information that exists to correspond to the slot 21100. The cache management information 2750 includes a next cache management information pointer 2751, an allocated logical volume address 2752, a block bit map 2753, an update bit map 2754, an unaccessible bit map 2755, a last access address flag 2756, a direct transfer flag 2757, a direct access stop flag 2758, and an old data destroy flag 2759.

The next cache management information pointer 2751 points to the cache management information 2750 corresponding to a slot in a state of storing no data, and the slot stores the next data.

The allocated logical volume address 2752 indicates from which address of which logical volume data of an area where allocation is started has been stored when the data is stored in the corresponding slot. The block bit map 2753 indicates a block (minimum read/write unit) stored in the cache 210 or the buffer of the storage unit 160 in this area. The block bit map 2753 is turned on during storage.

The update bit map 2754 indicates a block for which a write request from the server 110 has been received but which has not yet written to the storage unit 160. The update bit map 2754 is turned on in an unwritten state.

The unaccessible bit map 2755 indicates a block that returns an error when a read request is made due to a failure or the like. If data is received and write is normally ended in a case where a write request is made, the data becomes readable, so that a corresponding bit of the unaccessible bit map 2755 is turned off. In the first embodiment, the data is directly transferred to the storage box 130 in response to sequential write. In the sequential write, data is written in the order of address.

The last access address flag 2756 indicates an address accessed in the previous request. As a result, it is possible to check whether the access is made in the order of address. Further, it is possible to directly transmit data to the storage box 130 or stop the transmission. Regarding the bit map information and the last access address flag 2756, it is assumed that correct values are stored even if the conventional processing of writing data in the cache where direct data transfer is not performed is executed.

The direct transfer flag 2757 indicates that direct data transfer from the server 110 to the storage box 130 is being performed in an area corresponding to a current slot. A direct access stop flag 2758 is a flag indicating that the direct transfer has been stopped for some reason. Regarding the old data destroy flag 2759, in a case where a parity is generated after the storage box 130 receives data of the entire parity group and a failure occurs during write of the data and the parity of the entire parity group to the storage unit 160, the flags of all pieces of the cache management information 2750 of the parity group are turned on if there is a possibility that old data has already been destroyed.

Figure 11:
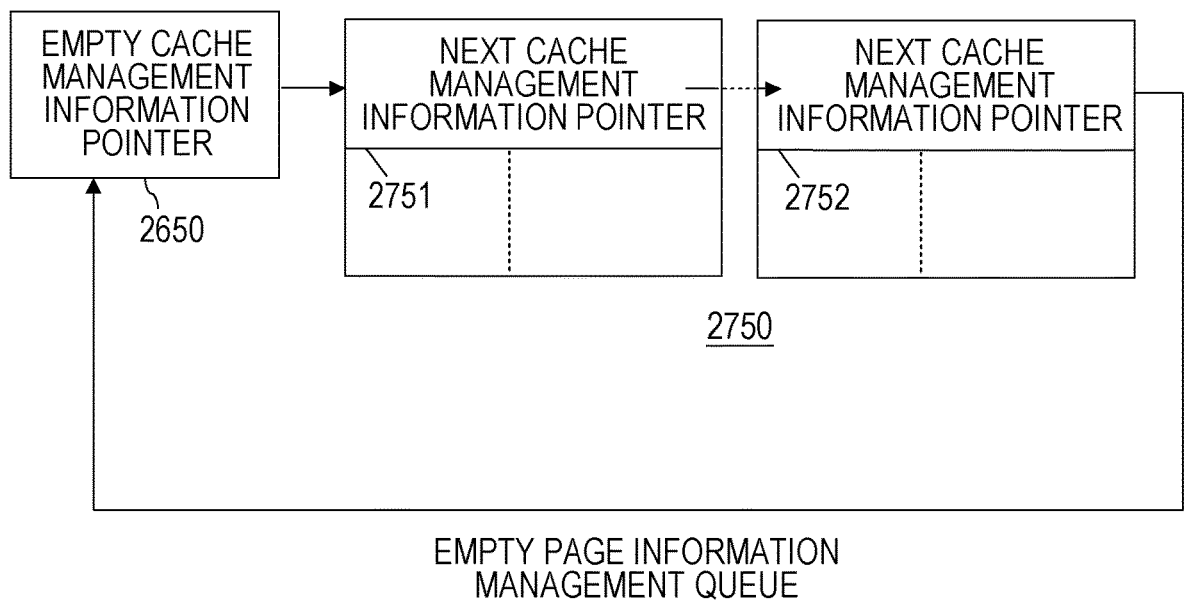
FIG. 11 is a view illustrating a format of an empty cache management information queue according to the first embodiment.

FIG. 11 illustrates a management scheme of the cache management information 2750 corresponding to a slot in which the data managed by the empty cache management information pointer 2650 is not stored. The empty cache management information pointer 2650 points to the head cache management information 2750 corresponding to the slot storing no data, and the next cache management information 2750 is pointed to by the next cache management information pointer 2751.

Figure 12:
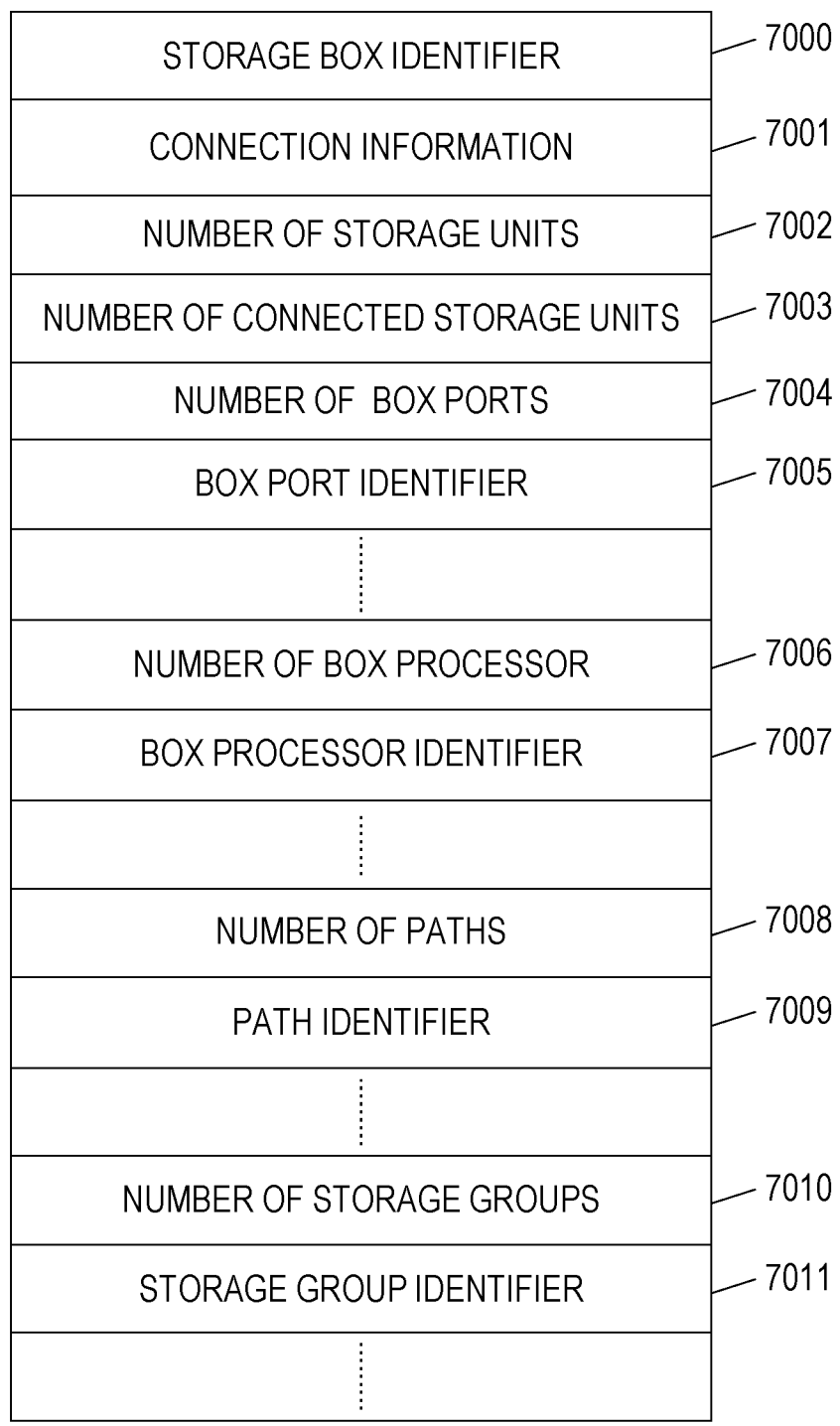
FIG. 12 is a view illustrating a format of storage box information according to the first embodiment.

FIG. 12 illustrates a configuration of the storage box information 2050. The storage box information 2050 is information provided for each of the storage boxes 130.

The storage box information 2050 includes a storage box identifier 7000, connection information 7001, a number of storage units 7002, a number of connected storage units 7003, a number of box ports 7004, a box port identifier 7005, a number of box processors 7006, a box processor identifier 7007, a number of paths 7008, a path identifier 7009, a number of storage groups 7010, and a storage group identifier 7011.

The storage box identifier 7000 is an identifier of the corresponding storage box 130. The connection information 7001 is information indicating whether the storage box 130 is connected to each of the real storage systems 100 or not.

The number of storage units 7002 is the number of the storage units 160 that can be connected to the storage box 130. The number of connected storage units 7003 is the number of actually connected storage units 160. The number of box ports 7004 is the number of the box ports 180 of the storage box 130 connected to the network 120, and the box port identifier 7005 is an identifier of each of the box ports 180.

The number of box processors 7006 is the number of the box processors 170 in the storage box 130. The box processor identifier 7007 is an identifier of each of the box processors 170. The number of paths 7008 is the number of paths between the storage units 160 in the storage box 130 and the box processors 170. The path identifier 7009 is an identifier of each of the storage paths 197. The number of storage groups 7010 is the number of storage groups included in the storage box 130. The storage group identifier 7011 is an identifier of the storage group included in the storage box 130. In the first embodiment, the storage units 160 constituting the storage group are included in one storage box 130. However, the present invention is advantageous even if the storage group is constituted by the storage units 160 of the plurality of storage boxes 130.

Figure 13:
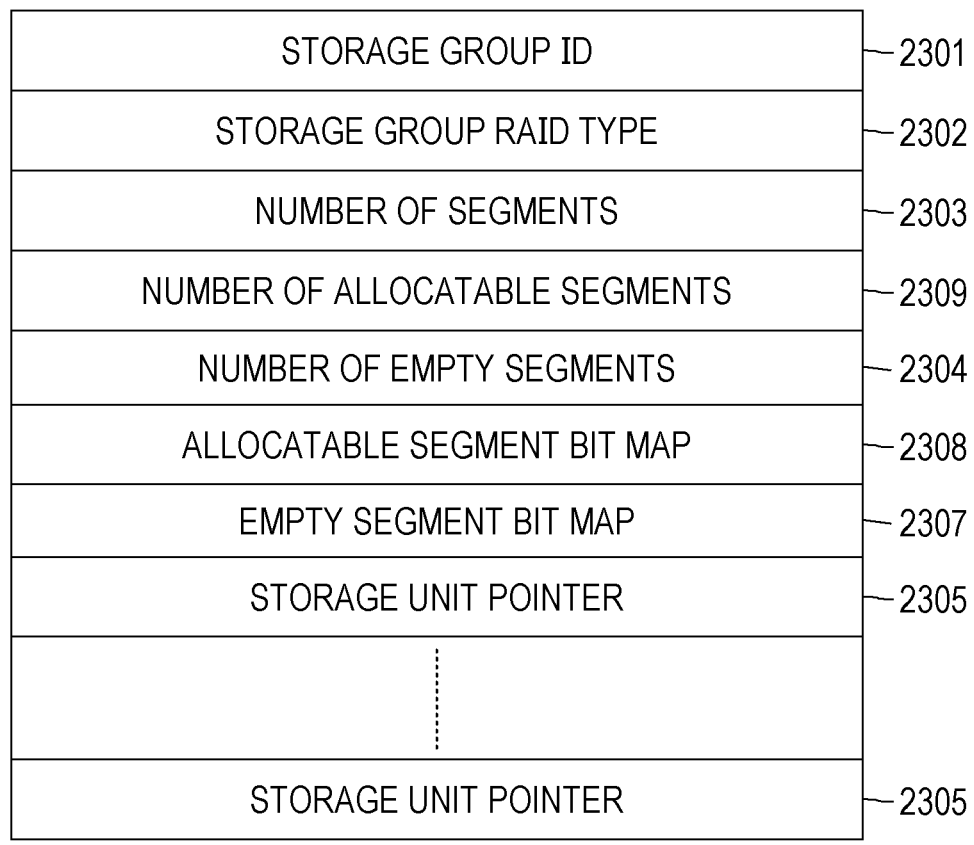
FIG. 13 is a view illustrating a format of storage group information according to the first embodiment.

FIG. 13 illustrates a format of the storage group information 2300. The storage group information 2300 includes a storage group ID 2301, a storage group RAID type 2302, a number of segments 2303, a number of allocatable segments 2309, a number of empty segments 2304, an allocatable segment bit map 2308, an empty segment bit map 2307, and a storage unit pointer 2305.

The storage group ID 2301 is an identifier of the storage group information 2300. This identifier also includes an identifier of the storage box 130. The storage group RAID type 2302 is a RAID type of the corresponding storage group. The RAID type in the first embodiment is the same as what has been described when describing the logical volume RAID group type 2003. In the first embodiment, the storage controller 200 does not have the capacity virtualization function, and thus, when the logical volume is defined, the area corresponding to the capacity thereof is secured. In the first embodiment, the capacity of the storage group information 2300 is divided into the units called segments. When the capacity of the logical volume is defined, a minimum number of segments equal to or larger than the capacity are secured. The number of segments 2303 indicates the number of segments of the storage group. The number of allocatable segments 2309 indicates the number of segments for which the real storage system 100 has an allocation right. Since the storage group in the storage box 130 is shared by the plurality of real storage systems, a set of segments having the allocation right is determined for each of the real storage systems 100. The allocatable segment bit map 2308 indicates whether the corresponding real storage system 100 has the allocation right for each segment or not. The number of empty segments 2304 indicates the number of empty segments among the segments for which the storage group has the allocation right. The empty segment bit map 2307 is information indicating whether each segment is empty or allocated among segments for which the storage group has the allocation right. The number of storage unit pointers 2305 is the number of the storage units 160 that belong to the storage group, which is a value determined by the storage group RAID type 2302. The storage unit pointer 2305 is an identifier of the storage unit 160 belonging to the storage group.

FIG. 14 illustrates a format of the storage unit information 2500. The format of the storage unit information 2500 is a storage unit identifier 2510, a number of connected paths 2501, a connection path identifier (connection path) 2502, a storage type 2503, a capacity 2504, a number of temporary write areas 2505, a temporary write area address 2506, and a using flag 2507.

The storage unit identifier 2510 is an identifier of the storage unit 160. The number of connected paths 2501 is the number of the storage paths 197 between the storage units 160 and the box processor 170. The connection path identifier 2502 indicates an identifier of the connected path. The storage type 2503 indicates what kind of storage medium the storage unit 160 is, such as a HDD and a flash memory. The capacity 2504 is the capacity of the corresponding storage unit. In the first embodiment, the storage types 2503 and the capacities 2504 of the storage units 160 constituting the storage group are equal. The number of temporary write areas 2505 is the number of areas secured for temporary write to receive data of the entire parity group when the data is directly written to the storage box 130. In the first embodiment, a size of the area is the capacity of one parity group. The temporary write area address 2506 is an address of a temporary write area. In the first embodiment, temporary write areas of two storage units are selected and the data of the parity group is written in the respective areas. However, the present invention is also advantageous even if one temporary write area is constituted by a plurality of (n) storage units 160, two write areas are selected, and the data is written to 2n storage units. Note that the temporary write area is an area where write from the server 110 is not directly specified. The using flag 2507 is a flag that exists corresponding to a temporary write area, and indicates that the temporary write area is in use.

Figure 15:
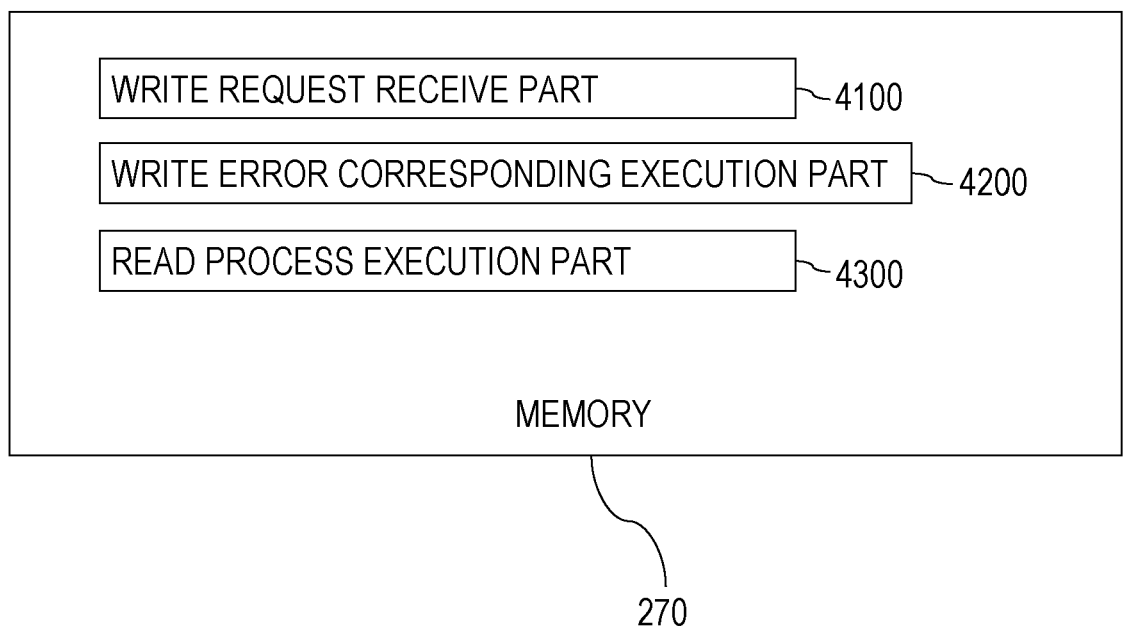
FIG. 15 is a diagram illustrating a configuration of a program executed by a storage controller according to the first embodiment.

Next, an operation executed by the storage controller 200 will be described using the management information described above. First, an operation of the storage controller 200 will be described. The operation of the storage controller 200 is executed by the processor 260 in the storage controller 200, and programs therefor are stored in the memory 270. FIG. 15 illustrates programs related to the first embodiment and stored in the memory 270. The programs related to the first embodiment are a write request receive part 4100, a write abnormal end corresponding part 4200, and a read process execution part 4300.

Figure 16A:
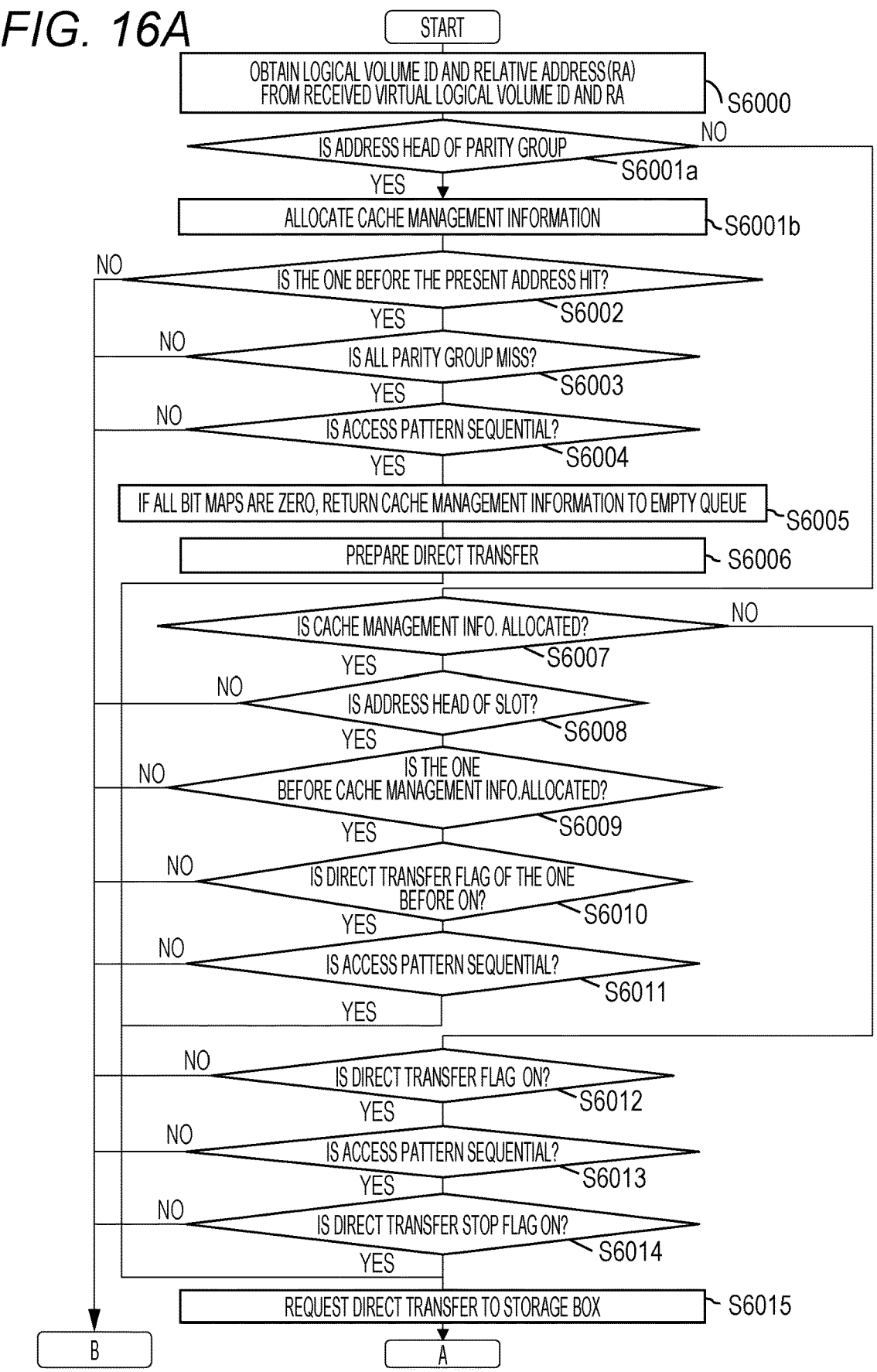
FIG. 16A is a view illustrating a processing flow of a write request receive part according to the first embodiment.
Figure 16B:
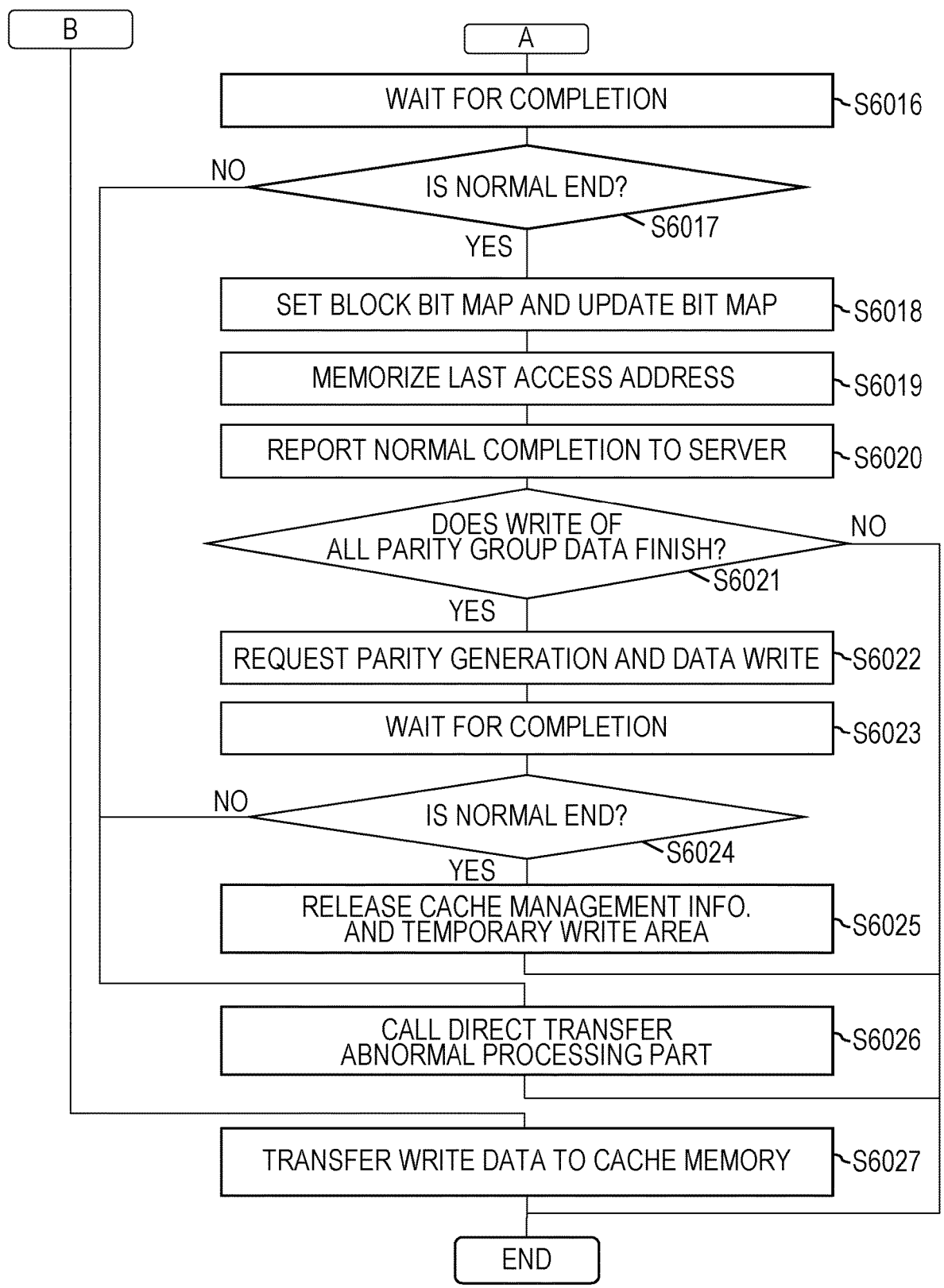
FIG. 16B is a view illustrating a processing flow of the write request receive part according to the first embodiment.

FIGS. 16A and 16B are processing flows of the write request receive part 4100. The write request receive part 4100 is executed when the storage controller 200 receives a write request from the server 110.

The description starts with FIG. 16A.

Step S6000: The processor 260 converts a virtual logical volume specified by the received write request into a logical volume according to the virtual logical volume information 2055.

Step S6001a: It is determined whether an address of the received write request is a head address of a parity group. If not, the processing jumps to Step S6007.

Step S6001b: Cache management information is allocated.

Step S6002: In the case of the head, it is checked whether the cache management information 2750 has been allocated to an immediately previous area. If not allocated, the direct transfer is not performed, and thus, the conventional processing of transferring write data to the cache 210 is executed, and the processing jumps to Step S6027.

Step S6003: It is checked whether the cache management information 2750 of the entire parity group is missing. If there is at least one cache management information that has been allocated, the direct transfer is not performed in the first embodiment, and thus, the processing jumps to Step S6027. Note that the present invention is advantageous even if the direct transfer is executed when there is the allocated cache management information.

Step S6004: The last access address of the immediately previous cache management information 2750 is checked to check if the current access is sequential access. If the current access is not sequential access, the direct transfer is not performed, and thus, the conventional processing of transferring write data to the cache 210 is executed, and the processing jumps to Step S6027.

Step S6005: It is checked whether all of the updated bit maps 2754 and the unaccessible bit map 2755 of the immediately previous cache management information 2750 are turned off. If all of them are turned off, this cache management information 2750 is returned to the empty cache management information pointer (queue) 2650.

Step S6006: Here, a preparation process of directly transferring write data to the storage box 130 starts. Here, the cache management information 2750 is allocated from the empty cache management information pointer 2650 to the first cache management information pointer 2022 and the second cache management information pointer 2023 in the area corresponding to the parity group. Then, the direct transfer flag 2757 of each piece of cache management information 2750 is turned on. The block bit map 2753, the update bit map 2754, and the unaccessible bit map 2755 are all cleared. Next, two temporary write area addresses 2506 of different storage units 160 are selected from among the temporary write area addresses 2506 of the storage units 160 of the storage box 130 storing the parity group with the using flag 2507 in the off state, and set in the first storage pointer 2024 and the second storage pointer 2025. After the selection, the using flag 2507 is turned off. (Note that the allocation is stopped if slot management information in an empty state and unused temporary write areas are insufficient, the direct transfer is not executed, the processing jumps to Step S6027, and the conventional processing is executed.) Thereafter, the processing jumps to Step S6015.

Step S6007: This step is executed in the case of receiving a write request for an address other than the head of the parity group. First, it is checked whether the cache management information 2750 is allocated to the corresponding area. If it is not allocated, the direct data transfer is not executed, and thus, Step S6012 is determined, and the processing jumps to Step S6027.

Step S6008: Hereinafter, whether the access is sequential is checked. In this step, it is checked whether the access is made for the head of the corresponding slot. If it is not the head, the processing jumps to Step S6027.

Step S6009: In the case of the address of the head, it is checked whether the cache management information 2750 has been allocated to an immediately previous area. If it is not allocated, the direct data transfer is not executed, and thus, the processing jumps to Step S6027.

Step S6010: If allocated, the direct transfer flag 2757 of the immediately previous cache management information 2750 is checked. If the direct transfer flag 2757 is in the off state, the direct data transfer is not executed, and thus, the processing jumps to Step S6027.

Step S6011: Next, the last access address flag 2756 of the immediately previous cache management information 2750 is checked in order to confirm whether the access is sequential. If it is not sequential, the processing jumps to Step S6027 to stop the direct transfer. In addition, it is checked whether the direct access stop flag 2758 is turned on. In the case of the on state, the processing jumps to Step S6027 to stop the direct transfer. In the case of the off state, the processing jumps to Step S6015 to execute the direct transfer.

Step S6012: The direct transfer flag 2757 of the cache management information 2750 is checked. If the direct transfer flag 2757 is in the off state, the direct data transfer is not executed, and thus, the processing jumps to Step S6027.

Step S6013: Next, the last access address flag 2756 of the current cache management information 2750 is checked in order to confirm whether the access is sequential. If it is not sequential, the processing jumps to Step S6027 to stop the direct transfer.

Step S6014: Next, it is checked whether the direct access stop flag 2758 is turned on. In the case of the on state, the processing jumps to Step S6027 to stop the direct transfer. In the case of the off state, the direct transfer starts in the following steps.

Step S6015: In this step, the storage box 130 is instructed to perform the direct transfer. At this time, an address for originally writing the write data and two addresses for temporary write are specified. Further, the address for the original write is transmitted to the server 198.

FIG. 16B will be described.

Step S6016: The processing waits for the completion.

Step S6017: Either normal end or abnormal end is determined. In the case of the abnormal end, first, an abnormal end report is sent to the server 110. In the case of the access to one other than the head of the parity group, the processing jumps to Step S6026. (In the case of the access to the head of the parity group, there is no write data returning the normal end report, and thus, it is unnecessary to perform post-processing.) Note that the case of the abnormal end also includes a case where there is no completion report from the storage box 130 even after a lapse of a certain period of time and the time is up under time monitoring of the storage controller 200.

Step S6018: The block bit map 2753 and the update bit map 2754 corresponding to the data stored in the temporary area are set.

Step S6019: An access address of the write request is stored in the last access address.

Step S6020: Normal end is reported to the server 110.

Step S6021: It is checked whether write of the entire parity group is completed. If not completed, the processing is completed.

Step S6022: If completed, the storage box 130 is instructed to generate a parity and write the write data and the parity in an area where the write data and the parity needs to be written.

Step S6023: The processing waits for the completion.

Step S6024: Either normal end or abnormal end is determined. In the case of the abnormal end, the processing jumps to Step S6026 in order to execute processing to stop the direct transfer. Note that the case of the abnormal end includes the case where there is no completion report from the storage box 130 even after a lapse of a certain period of time and the time is up under the time monitoring of the storage controller 200. Further, in a case where the processing ends abnormally in this step, when a failure occurs during write of the data and the parity of the entire parity group to the storage unit 160, the old data destroy flags 2759 of all pieces of the cache management information 2750 of the parity group are turned on since there is a possibility that old data has already been destroyed.

Step S6025: Here, the cache management information 2750 allocated to the parity group and the temporary write area are released. Specifically, the cache management information 2750 other than the last cache management information 2750 is returned to the empty cache management information queue 2650. The bit map information such as the block bit map of the cache management information 2750 returned to the queue, the last access address, and the flag information are all turned off. In addition, regarding the last cache management information 2750, all pieces of information other than the last access address flag 2756 are turned off. Thereafter, the processing is ended.

Step S6026: Since abnormal processing has occurred, direct transfer abnormal processing is called to execute the post-processing of the direct transfer. Thereafter, the processing is ended.

Step S6027: A process of receiving the write data in the cache is executed. At this time, if the cache management information 2750 is not allocated to the corresponding area, the cache management information 2750 is allocated. Further, a currently accessed address is stored in the last access address. When the write request ends normally, the unaccessible bit map 2755 corresponding to the area written by the request is turned off if being turned on. If all the unaccessible bit maps of the cache management information 2750 are turned off, the direct access stop flag 2758 is turned off.

Figure 17:
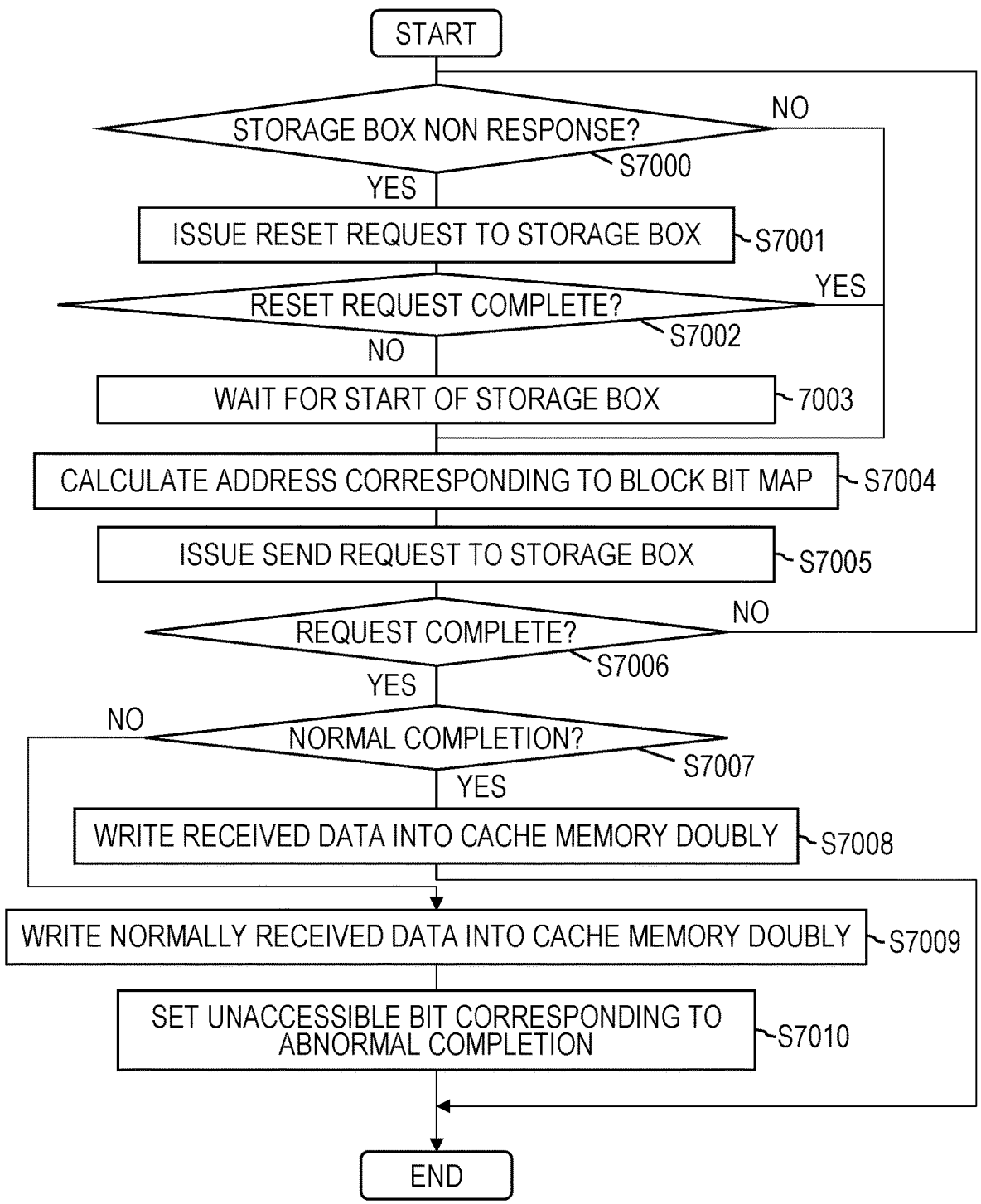
FIG. 17 is a view illustrating a processing flow of a write abnormal end corresponding part according to the first embodiment.

FIG. 17 is a processing flow of the write abnormal end corresponding part 4200. This processing is also processing that is appropriately executed by the processor 260.

Step S7000: It is checked whether the storage box 130 is abnormally ended with no response. If the processing has not ended with no response, the processing jumps to Step S7004.

If there is a failure notification from the storage box 130 to the storage controller 200, a result becomes "NO" in this step, and the processing jumps to Step S7004. The failure notification includes a case where write data can be transmitted to the storage controller 200 when it is difficult to generate redundant data in the storage box 130.

Further, the failure notification also includes a case where data, which is not transmittable to the storage controller 200 from the storage box 130 due to a failure, exists in the write data, and this existence and an address of an area specified to write the data are sent to the storage controller 200.

Further, the failure notification also includes a case where write data or redundant data are transmitted to the storage controller 200 when it is difficult to write the write data or redundant data in an area specified for write in a storage medium due to a failure.

Step S7001: If the processing is ended with no response, the storage box 130 is likely to be incapable of communicating due to power-down or the like. In this step, a reset request is issued to the storage box once.

Step S7002: If the reset request is completed, the processing jumps to Step S7004.

Step S7003: Since there is a cause such as power-down of the storage box 130, contact is made with a storage manager, maintenance personnel, or the like, and the processing waits until the storage box 130 starts up. After the starting-up, the execution is started from Step S7004.

Step S7004: An address of a temporary write area that has stored data with the block bit map 2753 and the update bit map 2754 of the cache management information 2750 corresponding to the parity group in the on state. Further, the direct access stop flag 2758 of the cache management information 2750 corresponding to the parity group is turned on.

Step S7005: The storage box 130 is notified of this address (the address calculated in Step S7004) and is instructed to transmit these pieces of data to the storage controller 200. Note that the storage box 130 is instructed to transfer the data received from the server 110 in the first embodiment, but may be instructed to receive a parity from the storage box 130 and store the parity in the cache 210 when the storage box 130 has already generated the parity.

Step S7006: The processing waits for the completion. If the completion is not reported within a certain period of time, the processing jumps to Step S7000.

Step S7007: Either normal end or abnormal end is checked. When transfer of some data with respect to the storage box 130 fails, or when a report of existence of data that is not readable from the temporary write area is received from the storage box 130, the processing jumps to Step S7009.

Step S7008: When transfer of all the pieces of data with respect to the storage box is normally ended and the read of all the pieces of data in the temporary write area is reported from the storage box, the received data is written doubly in the area of the cache 210 corresponding to the corresponding slot management information 2705. Thereafter, the processing is ended.

Step S7009: Only the data successfully transferred and normally read from the temporary write area is written doubly in the area corresponding to the cache management information 2750.

Step S7010: The unaccessible bit map 2755 corresponding to the data whose transfer has failed or the data that is not readable from the temporary write area is turned on. Further, the write data and the area specified to write the data are stored.

When the unaccessible bit map 2755 corresponding to the parity group is not turned on (when all the pieces of data has been normally stored in the cache 210), the storage controller 200 can generate a parity and write the data and the parity to the storage unit 160. In the case of a slot having a bit with the unaccessible bit map 2755 in the on state, a new write request is made for an area corresponding to this unaccessible bit map 2755 in the on state, and the corresponding unaccessible bit map 2755 can be turned off if the data can be normally stored in the cache 210. If the old data destroy flag 2759 is turned off in a case where all the unaccessible bit maps 2755 are turned off in the cache management information 2750 corresponding to the slot, old data and an old parity are stored in the cache 210 of the storage controller 200, and a logic for generating a new parity from these pieces of data and storing the data and the parity in the storage unit 160 can be applied. When the old data destroy flag 2759 is turned on, it is difficult to use the old data for the parity generation. Thus, when all the unaccessible bit maps 2755 of all pieces of the cache management information 2750 corresponding to the parity group are turned off, the storage controller 200 can store the remaining data of the parity group in the cache 210, generates a parity from the data of the entire parity group, and write the updated data and the parity in the storage unit 160. Even when the old data destroy flag 2759 is turned off, the remaining data of the parity group may be stored in the cache 210, and a parity may be generated from the data of the entire parity group.

Figure 18:
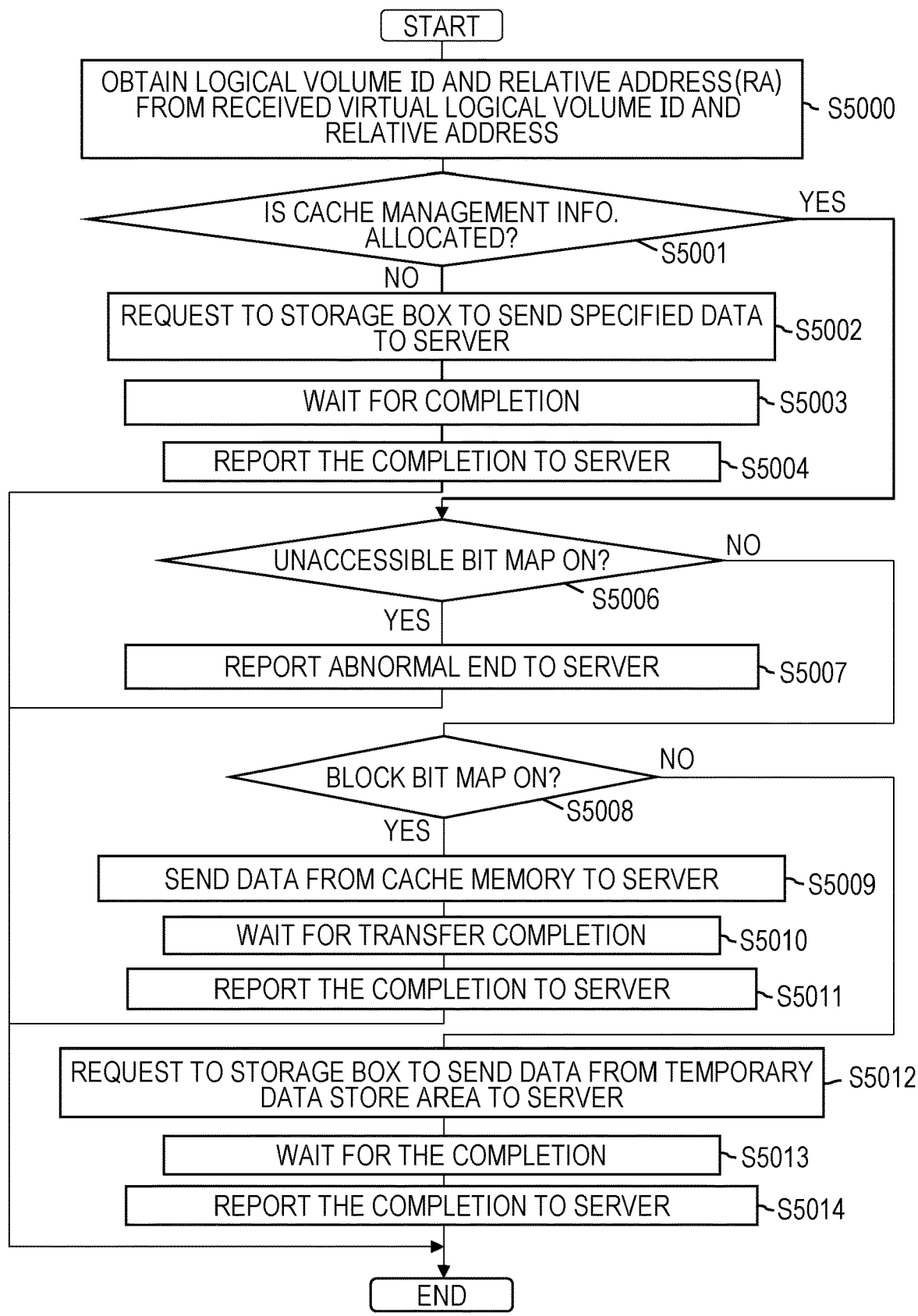
FIG. 18 is a view illustrating a processing flow of a read process execution part according to the first embodiment.

FIG. 18 is a processing flow of the read process execution part 4300. In the first embodiment, requested data is directly transferred from the storage box 130 to the server. It is a matter of course that the present invention is advantageous even if the data specified by the read request is transmitted from the storage box 130 to the server via the storage controller 200.

Step S5000: The processor 260 converts a virtual logical volume specified by the received read request into a logical volume according to the virtual logical volume information 2055, and acquires the corresponding logical volume information 2000.

Step S5001: Whether the cache management information 2750 is allocated to the corresponding area is checked from an address of the received read request. If allocated, the processing jumps to Step S5006.

Step S5002: The storage box 130 is instructed to transmit the specified data to the server 110.

Step S5003: The processing waits for the completion.

Step S5004: A completion report is sent to the server 110 to end the processing.

Step S5006: It is checked whether a bit of the unaccessible bit map 2755 corresponding to the requested data is turned on. If turned off, the processing jumps to Step S5007.

Step S5007: An abnormality that the data is unaccessible is reported to the server 110. This post-processing is ended.

Step S5008: Whether the direct transfer flag 2757 is turned on and the direct access stop flag 2758 is turned off is checked, and the processing jumps to Step S5012 if the conditions are satisfied. When the storage controller 200 receives the read request from the server 110 for a stored area, the read request is abnormally ended.

Step S5008: Whether the corresponding block bit map 2753 is turned on is checked. If turned off, the processing jumps to Step S5012.

Step S5009: The requested data is transferred from the cache to the server.

Step S5010: The processing waits for the completion of transfer.

Step S5011: A completion report is sent to the server 110.

Step S5012: The storage box 130 is instructed to send data from the corresponding area in the temporary write area to the server 110.

Step S5013: The processing waits for the completion.

Step S5014: A completion report is sent to the server 110 to end the processing.

Figure 19:
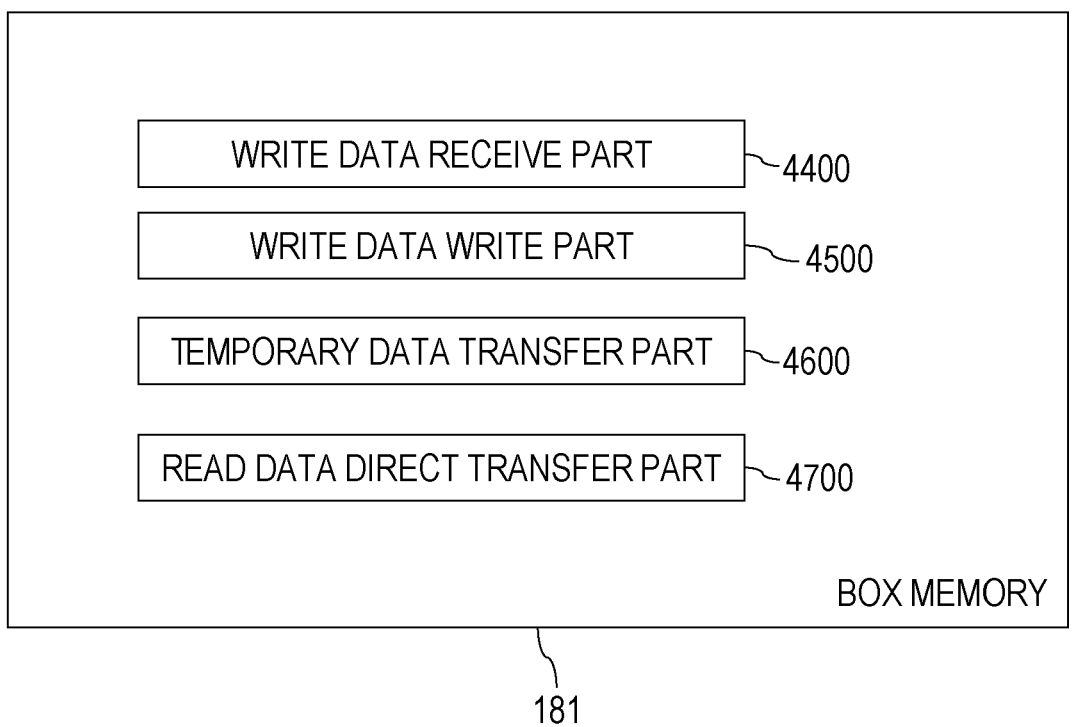
FIG. 19 is a view illustrating a configuration of a program executed by a storage box according to the first embodiment.

Next, a description will be given regarding an operation executed by the box processor 170 of the storage box 130 according to an instruction of the storage controller 200. Programs to be executed are stored in the box memory 181. FIG. 19 illustrates programs related to the first embodiment and stored in the box memory 181. The programs related to the first embodiment are a write data receive part 4400, a write data write part 4500, a temporary data transfer part 4600, and a read data direct transfer part 4700.

Figure 20:
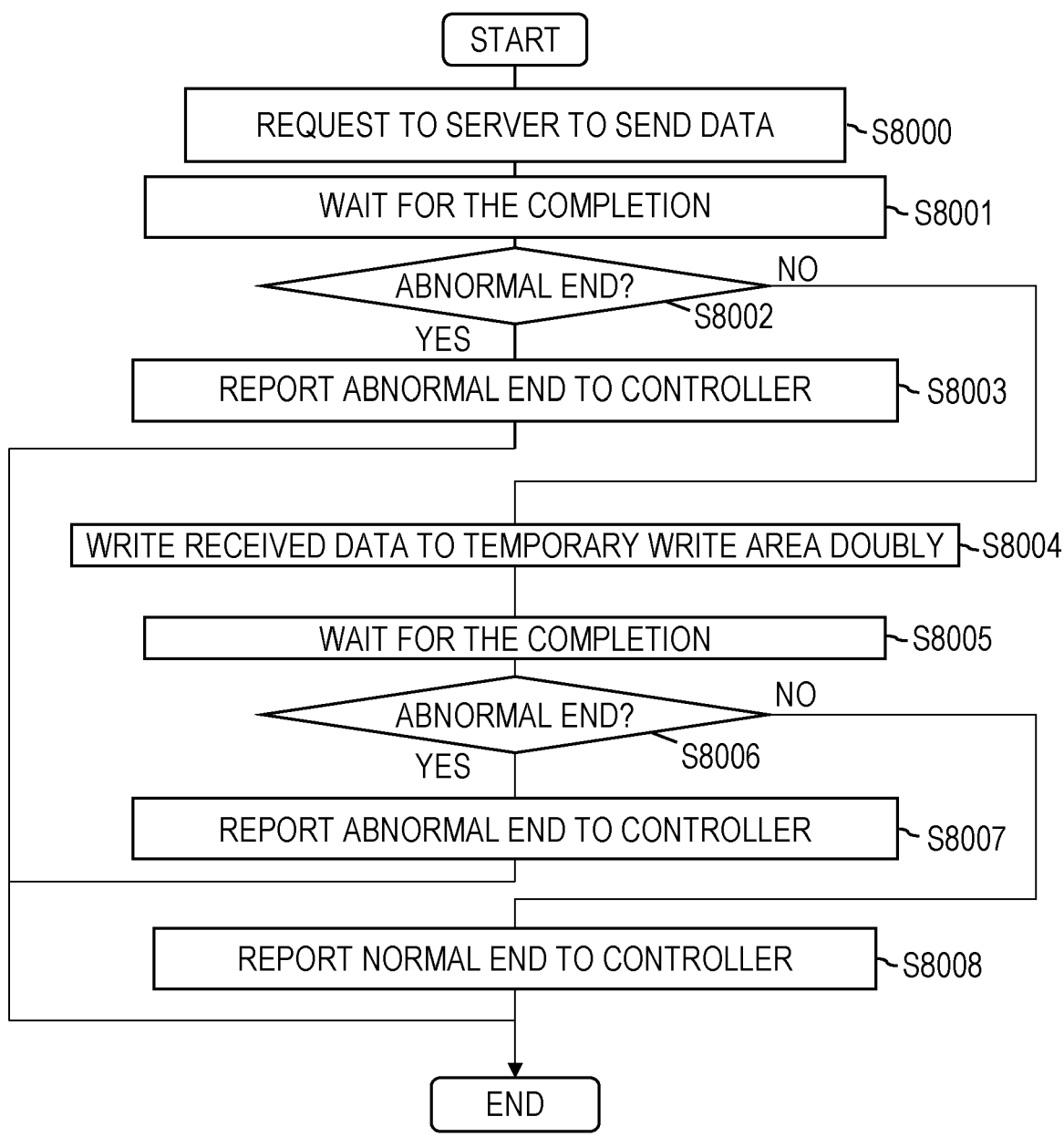
FIG. 20 is a view illustrating a processing flow of a write data receive part according to the first embodiment.

FIG. 20 is a processing flow of the write data receive part 4400. The write data receive part 4400 performs a process of receiving write data from the server 110 and writing the data in a temporary write area according to an instruction from the storage controller 200.

Step S8000: The server 110 is instructed to send data.

Step S8001: The processing waits for the completion of transfer.

Step S8002: In the case of normal end, the processing jumps to Step S8004.

Step S8003: An abnormal end report is returned to the storage controller to end the processing.

Step S8004: The received write data is written to addresses of two temporary write areas specified by the storage controller 200.

Step S8005: The processing waits for the completion of write.

Step S8006: In the case of normal end, the processing jumps to Step S8008.

Step S8007: An abnormal end report is returned to the storage controller to end the processing.

Step S8008: A normal end report is returned to the storage controller to end the processing.

Figure 21:
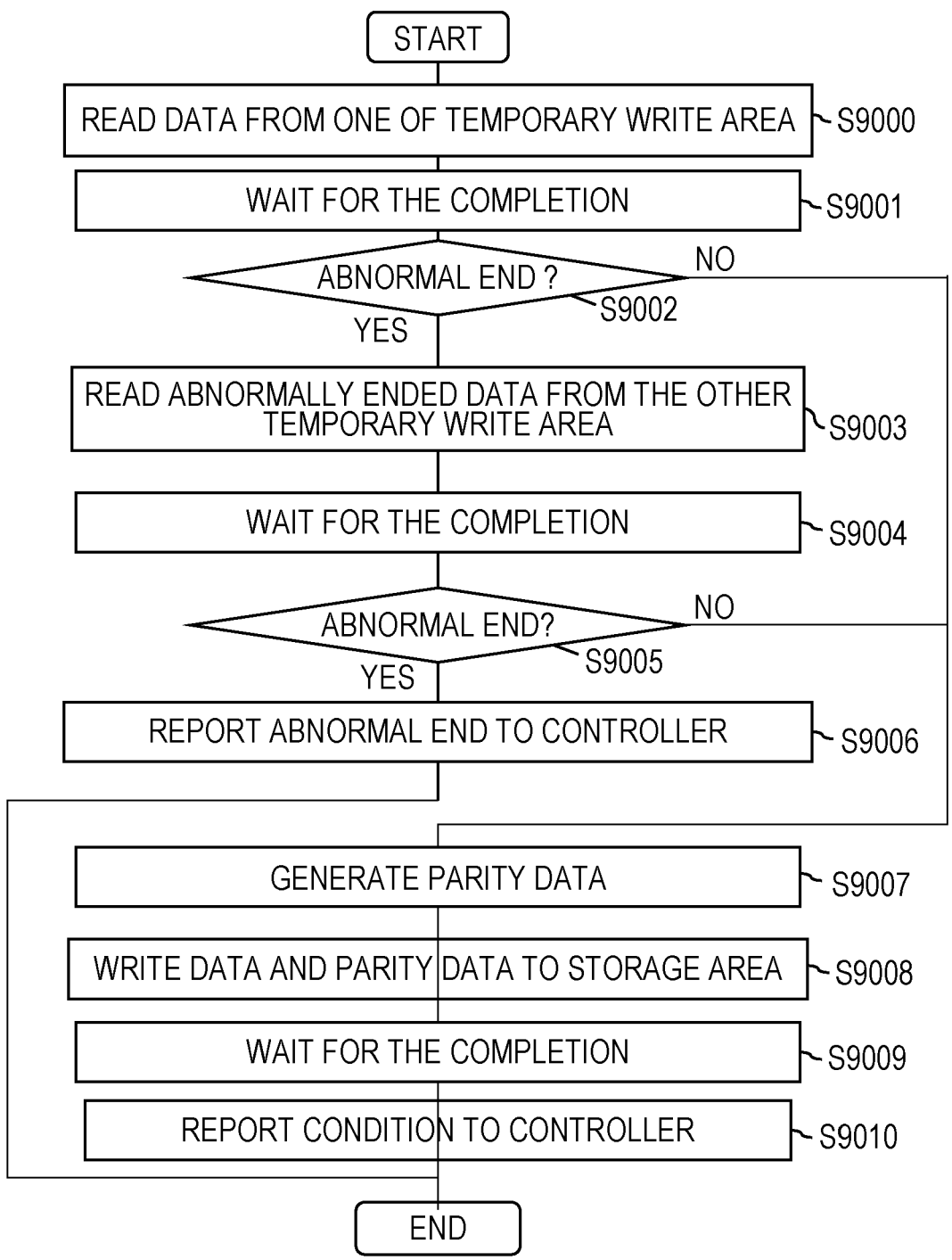
FIG. 21 is a view illustrating a processing flow of a write data write part according to the first embodiment.

FIG. 21 is a processing flow of the write data write part 4500. The write data write part 4500 reads write data from a temporary write area according to an instruction of the storage controller 200, generates a parity, and writes the write data and the parity from the storage controller 200 to a specified area of the storage unit 160.

Step S9000: Data is read from one of two temporary write areas specified by the storage controller 200.

Step S9001: The processing waits for the completion of processing.

Step S9002: It is checked whether read of all pieces of data has been normally ended. In the case of normal end, the processing jumps to Step S9007.

Step S9003: Only the abnormally ended data is read from the other temporary write area.

Step S9004: The processing waits for the completion.

Step S9005: It is checked whether read of all pieces of specified data has been normally ended, and the processing jumps to Step S9007 in the case of normal end.

Step S9006: The abnormal end is reported to the storage controller 200 to complete the processing.

Step S9007: A parity is generated from the read write data.

Step S9008: The write data and the parity are written in an area of the storage unit 160 specified by the storage controller 200.

Step S9009: The processing waits for the completion.

Step S9010: A normal end report is sent to the storage controller 200 when the write of all pieces of data is normally ended, and an abnormal end report is sent to the storage controller 200 when the write of at least one piece of data is abnormally ended.

Figure 22:
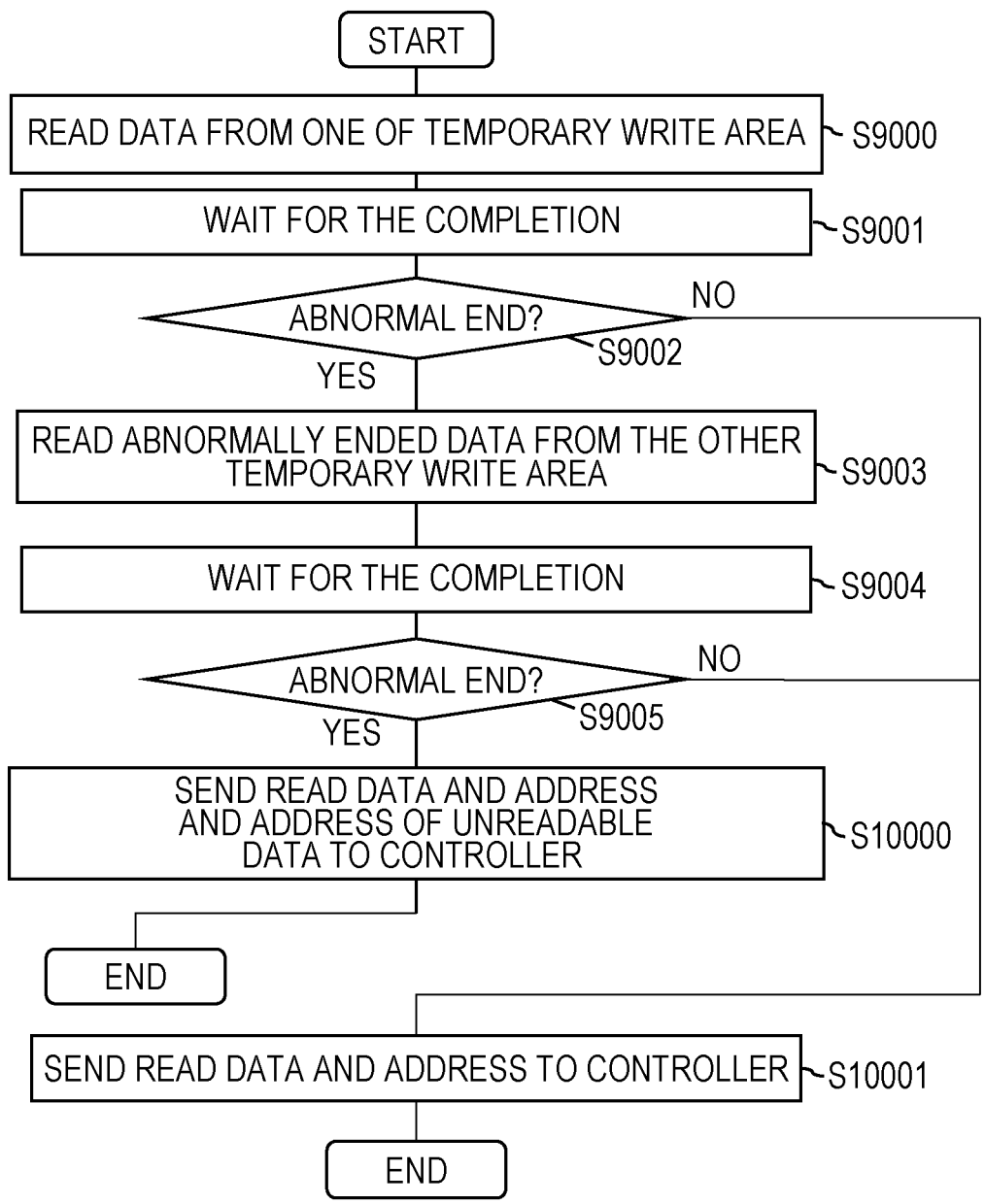
FIG. 22 is a view illustrating a processing flow of a temporary data transfer part according to the first embodiment.

FIG. 22 illustrates processing of the temporary data transfer part 4600. The temporary data transfer part 4600 reads write data from a temporary write area according to an instruction of the storage controller 200, and sends the write data to the storage controller 200. The process of reading the data from the temporary write area is similar to the processing from Steps S9000 to S9005 of the write data write part. Only the following process of sending the read data to the storage controller 200 is different.

Step S10000: This is a process performed when there is data that has not been normally read. All pieces of normally read data (write data and redundant data) and addresses thereof are sent to the storage controller 200. For the unreadable data, the storage controller 200 is notified of the failure in reading and an address of the unreadable data.

Then, the processing is completed.

Step S10001: Since all pieces of data has been read, the data and the address thereof are sent to the storage controller 200. Thereafter, the processing is ended.

As described above, the write data is sent to the storage controller 200 when it is difficult to generate the redundant data in the storage box 130 due to the failure.

Further, when data, which is not transmittable to the storage controller 200 from the storage box 130 due to the failure, exists in the write data, the storage controller 200 is notified of this existence and an address of an area specified to write the data.

Further, write data or redundant data are transmitted to the storage controller 200 when it is difficult to write the write data or redundant data in an area specified for write in a storage medium due to the failure.

Figure 23:
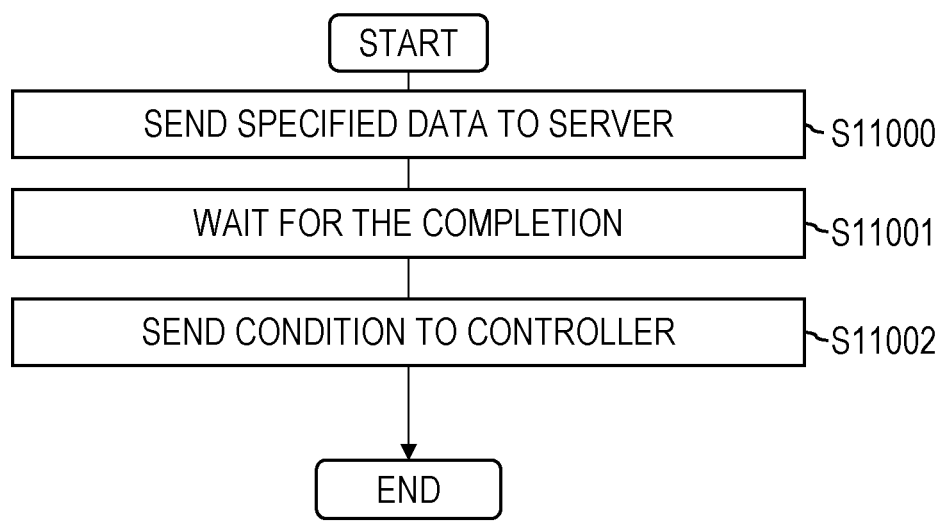
FIG. 23 is a view illustrating a processing flow of a read data direct transfer part according to the first embodiment.

FIG. 23 is a processing flow of the read data direct transfer part 4700. The read data direct transfer part 4700 performs a process of sending specified data to the server 110 according to an instruction from the storage controller 200. In the first embodiment, the storage controller 200 manages the temporary write area, and thus, the storage box 130 does not recognize the distinction between the area in which the data read/written by the server 110 is permanently stored or the temporary write area for creation of the parity. Therefore, the storage box 130 only sends the data of the specified area regardless of the area in which the data read/written by the server 110 is permanently stored or the temporary write area for creation of the parity. As above, the process of sending the data of the area in which the data read/written by the server 110 is permanently stored and the process of sending the data of the temporary write area for creation of the parity have the same processing flow, and both the processes are executed by the read data direct transfer part 4700.

Step S11000: The data of the specified area is sent to the server 110.

Step S11001: The processing waits for the completion of processing.

Step S11002: A normal end report is returned to the storage controller 200 in the case of normal end, and an abnormal end report is returned to the storage controller 200 in the case of abnormal end. Thereafter, the processing is ended.

Second Embodiment

Next, a second embodiment will be described. In the second embodiment, the storage controller 200 has a capacity virtualization function (thin provisioning). Further, the storage controller 200 and the storage box 130 cooperate to realize a compression/deduplication function. When implementing the compression/deduplication function, a write process adopts a log structure method. In this case, write data is a rewritable type, and is written at a new address.

Figure 24:
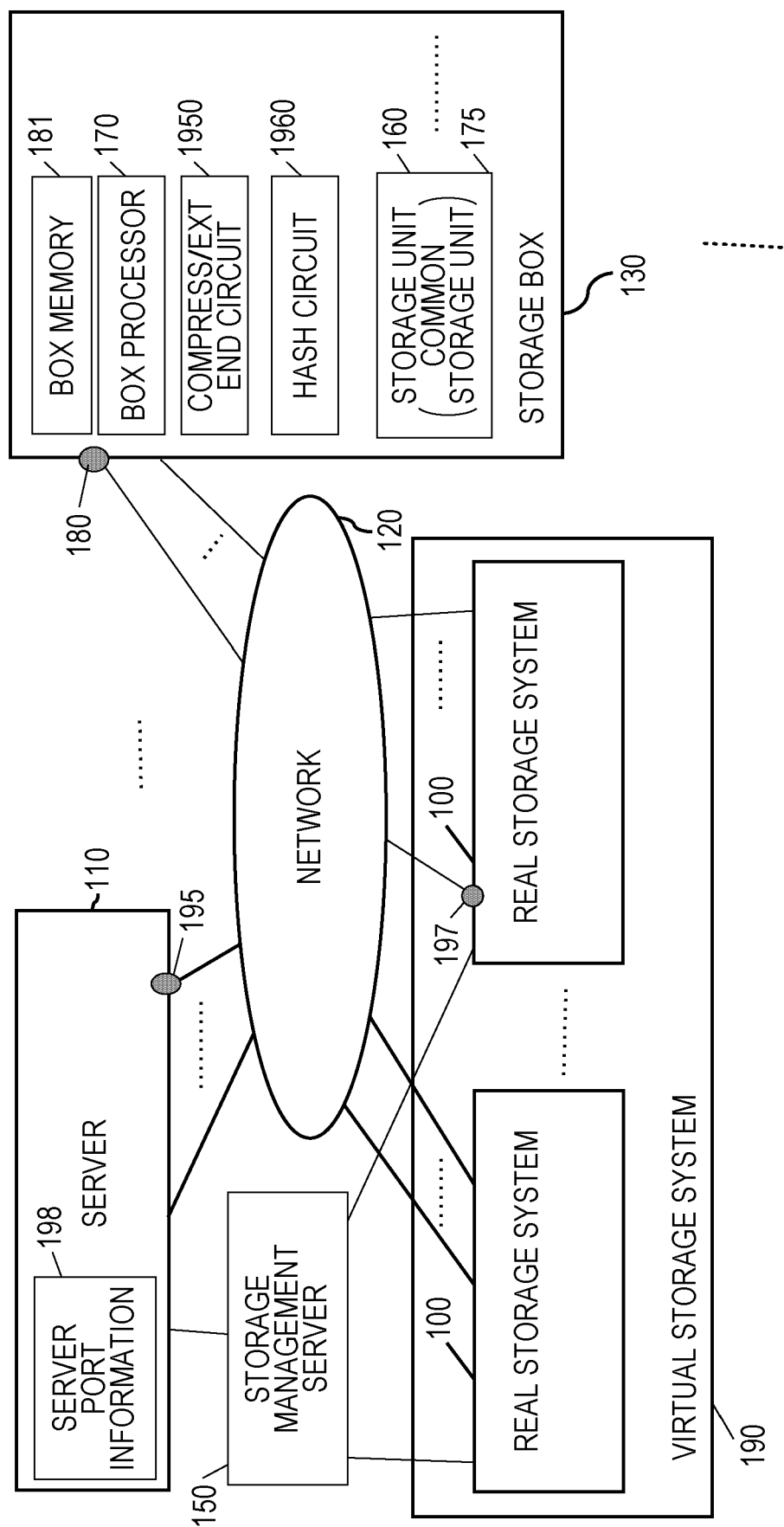
FIG. 24 is a diagram illustrating a configuration of an information system according to a second embodiment.

FIG. 24 illustrates a configuration of an information system according to the second embodiment. A difference between the information system according to the second embodiment and the information system according to the first embodiment is that the configuration of the storage box 130 is different. The difference is that the storage box 130 according to the second embodiment cooperates with the storage controller 200 and includes a plurality of compress/extent circuits 1950 and a hash circuit 1960 in addition to the components of the storage box 130 according to the first embodiment. However, the present invention is advantageous even if the box processor 170 executes such processes. In the second embodiment, the compress/extent circuit 1950 and the hash circuit 1960 exist corresponding to the box processor 170. However, the present invention is advantageous even if the compress/extent circuit 1950 and the hash circuit 1960 do not exist so as to correspond to the box processor 170.

A format of the server port information 198 according to the second embodiment is the same as the server port information of the first embodiment. A configuration of the real storage system 100 according to the second embodiment is the same as that of the first embodiment.

Figure 25:
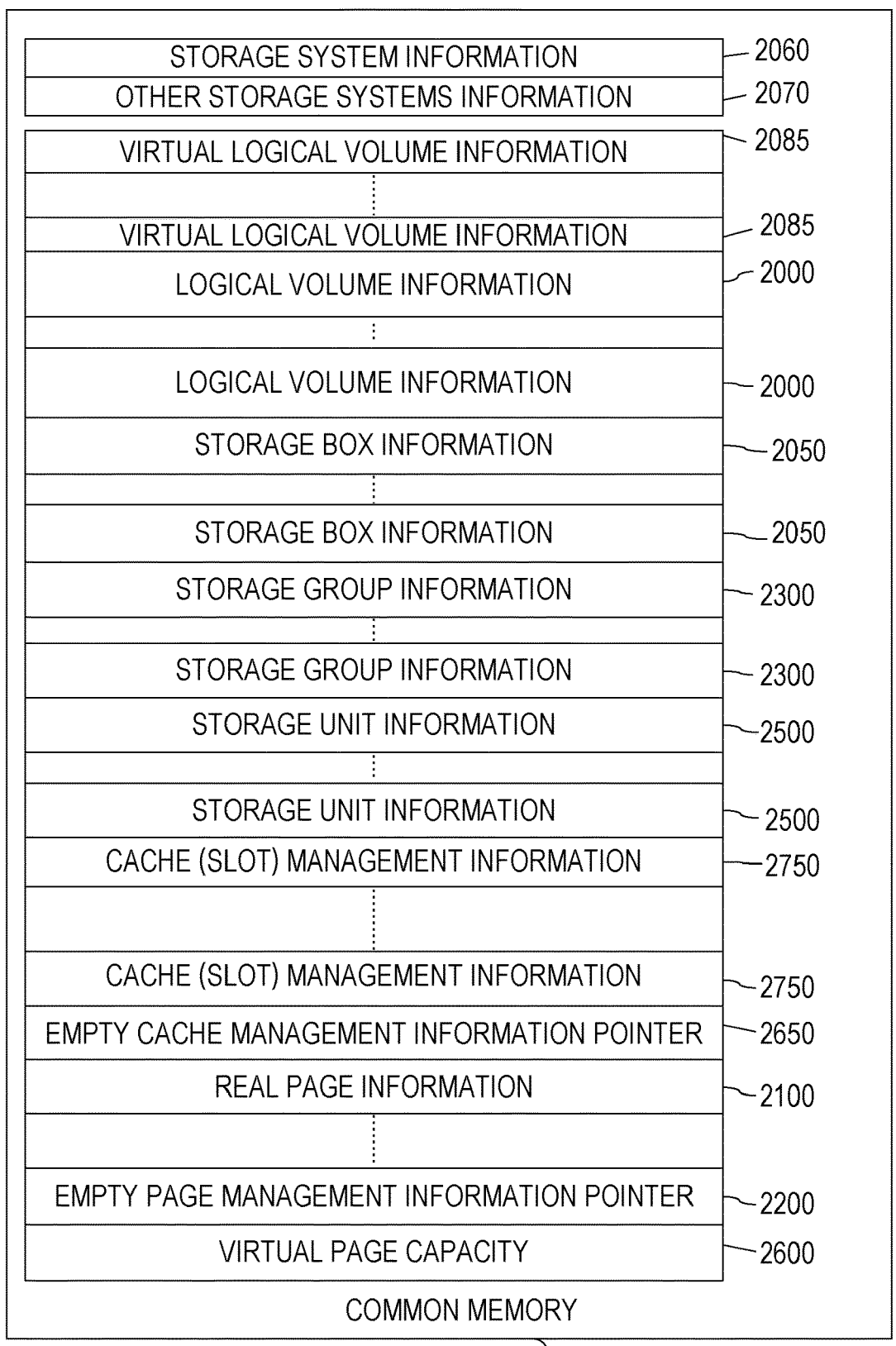
FIG. 25 is a view illustrating information stored in a common memory of the storage system according to the second embodiment.

FIG. 25 illustrates information related to the second embodiment in the common memory 220 of the real storage system 100 according to the second embodiment, and includes: the storage system information 2060, the virtual logical volume information 2085, the other storage systems information 2070, the logical volume information 2000, storage box information 2050, the storage group information 2300, the storage unit information 2500, the cache management information 2750, and the empty cache management information pointer 2650. In the second embodiment, new real page information 2100, empty page management information pointer 2200, and virtual page capacity 2600 are newly added. These pieces of information are information required to support the capacity virtualization function. Among them, the storage system information 2060 is similar to that of the first embodiment. A format of the other storage systems information 2070 is similar to that of the first embodiment. A format of the virtual logical volume information 2085 is similar to that of the first embodiment.

FIG. 26 illustrates a format of the logical volume information 2000 according to the second embodiment. Even in the second embodiment, a storage unit from and to which the server 110 reads and writes data is a virtual logical volume. Further, the server 110 issues a read request or a write request by specifying an ID of the virtual logical volume, an address within the virtual logical volume, and a length of the data to be read/written. When receiving the read/write request from the server 110, the real storage system 100 recognizes an identifier of a corresponding logical volume from the virtual logical volume information 2085. Even in the second embodiment, the logical volume identifier is unique information within the real storage system 100.

The logical volume information 2000 is information that exists for each logical volume. This information includes the logical volume identifier 2001, the logical capacity 2002, the logical volume type 2005, the logical volume RAID group type 2003, the first cache management information pointer 2022, the second cache management information pointer 2023, the mapping information (mapping address) 2004, the data length after compression 2018, the hash value 2019, a log structured pointer 2005, a log structure writing pointer 2006, a first data storage area pointer before compression 2007, a second data storage area pointer before compression 2008, a first data storage area pointer after compression 2009, a second data storage area pointer after compression 2010, a first invalid bit map before compression 2020, a second invalid bit map before compression 2021, a first invalid bit map after compression 2011, a second invalid bit map after compression 2012, a first writing pointer before compression 2013, a second writing pointer before compression 2014, a first writing pointer after compression 2015, a second writing pointer after compression 2016, and a logical volume direct transfer stop flag 2030.

The pieces of information, such as the logical volume identifier 2001, the logical capacity 2002, the logical volume type 2005, the logical volume RAID group type 2003, the first cache management information pointer 2022, and the second cache management information pointer 2023, are similar to those as in the first embodiment.

In the second embodiment, the storage controller 200 has the compression/deduplication function. When the compression/deduplication function is provided, write data is additionally written in the order of writing in a log structure stream. In the second embodiment, the log structure stream is provided to correspond to a logical volume. In the second embodiment, there is one log structure stream for each logical volume, but the present invention is advantageous even if there are a plurality of log structure streams for each logical volume for speeding up. Further, the present invention is advantageous even if the log structure stream does not correspond to the logical volume. The mapping information (mapping address) 2004 is information indicating any relative address of any real page to which a compression/deduplication unit of the logical volume is allocated. In the present invention, the write data is directly transferred to the storage box 130, and is stored doubly in temporary areas until a parity is generated. In such a case, two addresses thereof are illustrated. If not allocated, a null state is set.

In the second embodiment, the data length after compression 2018 indicates a data length after compression of a management unit thereof, and the hash value 2019 indicates a hash value of the management unit.

In the second embodiment, the storage controller 200 has the capacity virtualization function. In this case, data is written to a page. To the log structure writing pointer 2006, the real page information 2100 allocated to the log structure stream is connected in a queue. The log structure writing pointer 2006 indicates an address of a page to which data is written next. In the second embodiment, the write data is directly transferred to the storage box 130. At this time, the data is duplicated in the storage box 130, and a parity is not generated until data of a parity group is available. Since the storage controller 200 and the storage box 130 cooperate to perform the compression/deduplication in the second embodiment, the amount of data actually written in a storage unit is smaller than the received write data.

Since all pieces of data are duplicated, it is assumed that 2 m areas are allocated in m×2 planes to store data before compression/deduplication in the second embodiment. Each of the first data storage area pointer before compression 2007 and the second data storage area pointer before compression 2008 corresponds to m areas, the areas doubly storing the data before compression, and there are m pointers, respectively. Each of the first data storage area pointer after compression 2009 and the second data storage area pointer after compression 2010 corresponds to two areas, the areas doubly storing the data before compression, and there are two pointers, respectively.

In the second embodiment, write data is written in a new area in the log structure stream, and thus, the previous data becomes invalid. Such invalidation is likely to occur while existing in the areas indicated by the first data storage area pointer before compression 2007, the second data storage area pointer before compression 2008, the first data storage area pointer after compression 2009, and the second data storage area pointer after compression 2010. In this case, bits of the first invalid bit map before compression 2020, the second invalid bit map before compression 2021, the first invalid bit map after compression 2011, and the second invalid bit map after compression 2012 of the corresponding areas are turned on.

Further, addresses at which write data received next from the server 110 needs to be written are the first writing pointer before compression 2013 and the second writing pointer before compression 2014. Further, data addresses to which data after compression/deduplication needs to be written next are the first writing pointer after compression 2015 and the second writing pointer after compression 2016. In the second embodiment, the write data is written in the log structure stream in units of logical volumes, and basically transferred directly to the storage box 130. Therefore, the direct transfer is stopped in the unit of the logical volume if a failure occurs. The direct access stop flag 2758 indicates that the direct transfer of the write data of the logical volume is stopped.

The cache management information 2750 is basically similar to that of the first embodiment. However, the last access address flag 2756 may be omitted.

A format of the empty cache management information pointer 2650 is similar to that of the first embodiment.

A feature of the second embodiment is that the real storage system 100 supports the capacity virtualization function. In general, a unit of allocating a storage area is called a page in the capacity virtualization function. Further, a logical volume is generally a logical storage unit from and to which the server 110 reads and writes data. However, a feature of the present invention is that the area of the storage unit used for caching is defined as the logical volume. Further, the capacity virtualization function is applied to this logical volume to allocate the page, thereby securing the real storage area.

In the second embodiment, it is assumed that a space of the logical volume is divided in units called virtual pages, and an actual storage unit group is divided in units called real pages. In capacity virtualization, the storage capacity of a logical volume is made to appear larger than the actual capacity of a storage medium. Therefore, the number of virtual pages is generally larger than the number of real pages. When the capacity virtualization function is realized, the real page is allocated when the storage controller 200 does not allocate a real page to a virtual page including an address for which write is instructed with a write request from the server 110. The virtual page capacity 2600 represents the capacity of the virtual page.

In the second embodiment, however, the virtual page capacity 2600 and the real page capacity are not always equal. This is because the capacity of the real page contains redundant data that varies depending on a RAID type. Therefore, the capacity of the real page is determined by a RAID type of a storage unit group to which the real page is allocated. For example, when data is written doubly as in RAID 1, the capacity of the real page is twice the virtual page capacity 2600. When storing redundant data of the capacity of one storage unit with respect to the capacity of N storage units as in RAID5, the capacity which is (N+1)/N times of the virtual page capacity 2600 is secured. It is a matter of course that the capacity equal to the virtual page capacity 2600 is the capacity of the real page when there is no redundancy as in RAID0.

Although the virtual page capacity 2600 is common among the storage systems 100 in the second embodiment, the present invention is advantageous even if the virtual page capacity 2600 differs among the storage systems 100. In the second embodiment, each storage unit group is configured with RAID5. It is a matter of course that the present invention is advantageous even if the storage unit group is configured with an arbitrary RAID group.

A configuration of the storage box information 2050 is similar to that of the first embodiment.

Figure 27:
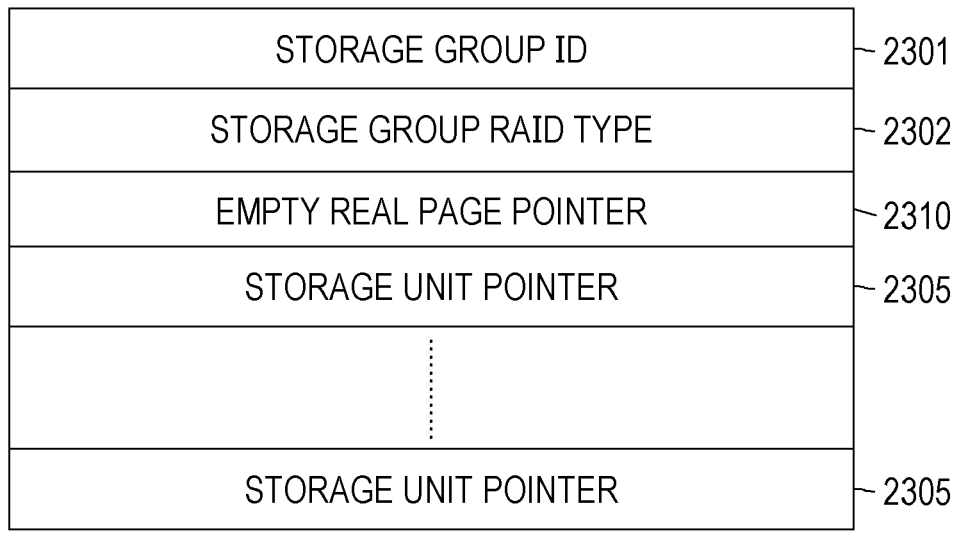
FIG. 27 is a view illustrating a format of storage group information according to the second embodiment.

FIG. 27 illustrates a format of the storage group information 2300 of the second embodiment. The storage group information 2300 according to the second embodiment does not include the number of segments 2303, the number of allocatable segments 2309, the number of empty segments 2304, the allocatable segment bit map 2308, the empty segment bit map 2307, which are included in the first embodiment, but includes an empty page information pointer 2310.

Figure 28:
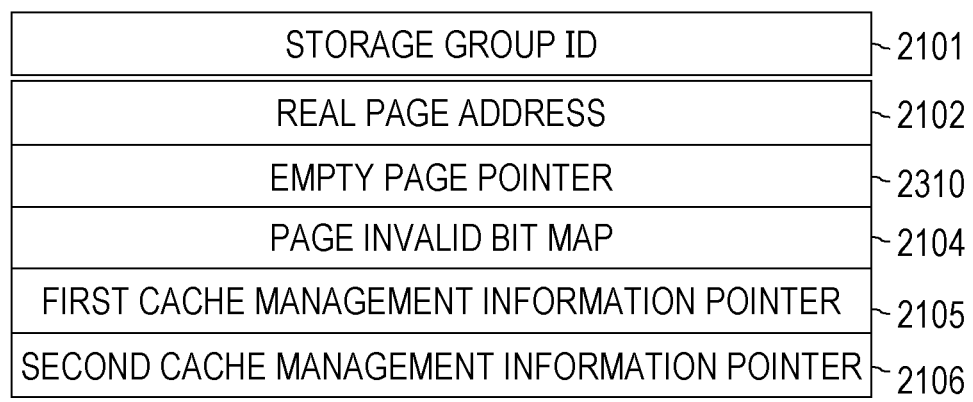
FIG. 28 is a view illustrating a format of real page information according to the second embodiment.

FIG. 28 illustrates a format of the real page information 2100. The real page information 2100 is management information of the corresponding real page that exists for each real page. The real page information 2100 includes a storage group identifier 2101, a real page address 2102, an empty page information pointer 2310, a page invalid bit map 2104, a first cache management information pointer 2105, and a second cache management information pointer 2106.

In the second embodiment, the write data is written in the new area in the log structure stream, and thus, the previous data becomes invalid. In this case, a bit of the page invalid bit map 2104 of the corresponding area is turned on. In the second embodiment, the data to be written to the log structure stream is stored doubly in the cache while a parity is generated and written in the storage unit 160. The first cache management information pointer 2105 and the second cache management information pointer 2106 are cache management information storing this data.

Since the generated parity is also stored in the cache 210, the cache management information 2750 for this purpose is also pointed to. The number of the first cache management information pointers 2105 and the second cache management information pointers 2106 is (Real page capacity (including parity)/Cache capacity managed by one cache management information 2750).

The storage group identifier 2101 indicates any storage group 280 to which the corresponding real page is allocated. Even in the second embodiment, the storage units 160 constituting the storage group 280 are included in one storage box 130. Note that the present invention is advantageous even if the storage units 160 constituting the storage group 280 are included in the plurality of storage boxes 130. The real page address is information indicating any relative address in the corresponding storage group 280 to which the real page is allocated. Empty page pointer 2103 becomes a valid value when a virtual page is not allocated to this real page. In this case, this value refers to empty page information in the corresponding storage group 280 to which the next virtual page is not allocated.

Figure 29:
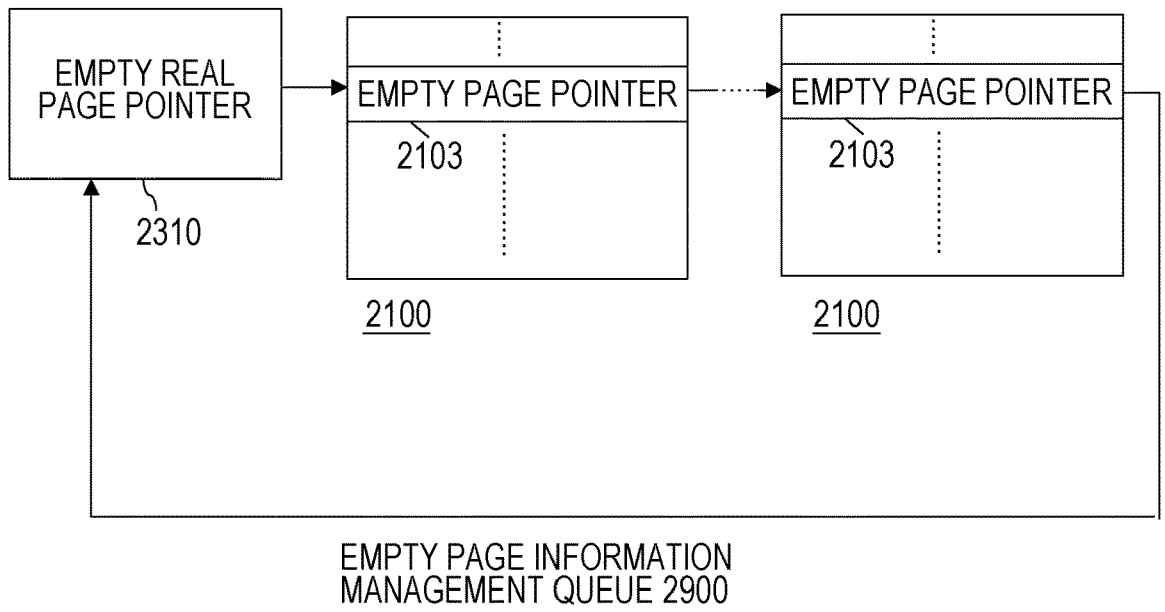
FIG. 29 is a view illustrating a configuration of an empty page management information queue according to the second embodiment.

The empty page information pointer 2310 is information provided for each storage group. FIG. 29 illustrates a set of empty real pages managed by the empty page information pointer 2310. The empty real page means a real page that is not allocated to a virtual page. Further, the real page information 2100 corresponding to the empty real page is referred to as empty real page information 2100. The entire structure is referred to as an empty real page information queue 2900. The empty page management information pointer 2200 (see FIG. 25) points to an address of head empty real page information 2100. Next, the empty page pointer 2103 in the head empty real page information 2100 points to next empty real page information 2100. The empty page pointer 2103 of last empty real page information 2100 indicates the empty page management information pointer 2200 in FIG. 29, but may be a null value. When receiving a write request for a virtual page to which no real page is allocated, the storage controller 200 searches for an empty real page based on the empty page management information pointer 2200, which corresponds to any storage group corresponding to the logical volume RAID group type 2003 and the allocation extent 2026 (see FIG. 9), for example, the storage group with the largest number of empty real pages in the corresponding storage unit group, and allocates the searched empty real page to the virtual page. The virtual page capacity 2600 represents the capacity of the virtual page.

A format of the storage unit information 2500 is similar to that of the first embodiment. However, an area indicated by the temporary write area address 2506 is an area to which no real page is allocated.

Figure 30:
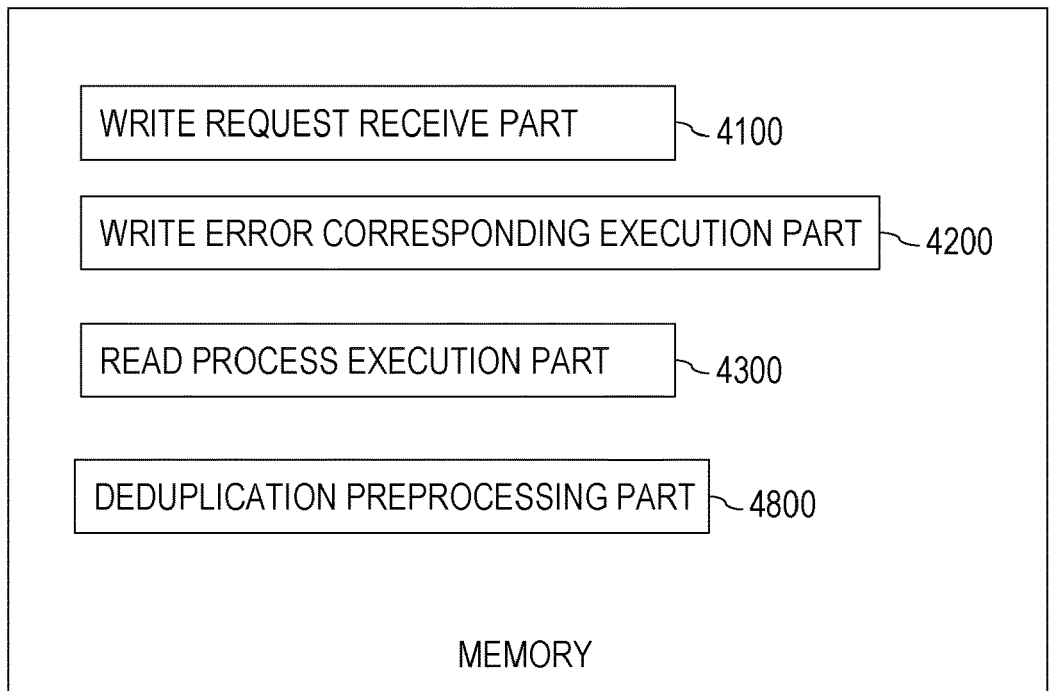
FIG. 30 is a diagram illustrating a configuration of a program executed by a storage controller according to the second embodiment.

Next, an operation executed by the storage controller 200 will be described using the management information described above. First, an operation of the storage controller 200 will be described. The operation of the storage controller 200 is executed by the processor 260 in the storage controller 200, and programs therefor are stored in the memory 270. FIG. 30 illustrates programs related to the second embodiment and stored in the memory 270. The programs related to the second embodiment include a deduplication preprocessing part 4800 in addition to those of the first embodiment.

Next, an operation executed by the storage controller 200 will be described using the management information described above.

Figure 31A:
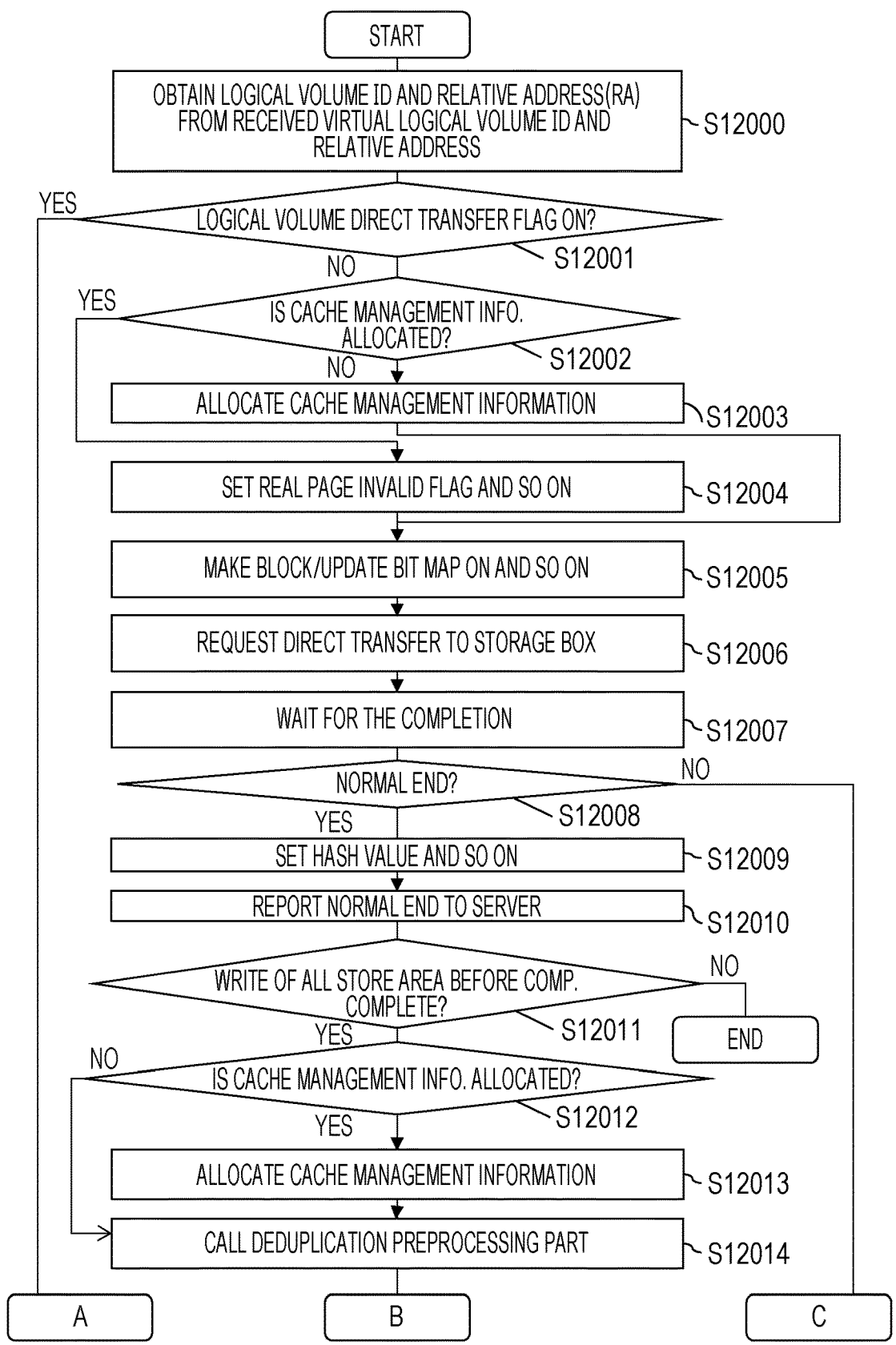
FIG. 31A is a view illustrating a processing flow of a write request receive part according to the second embodiment.
Figure 31B:
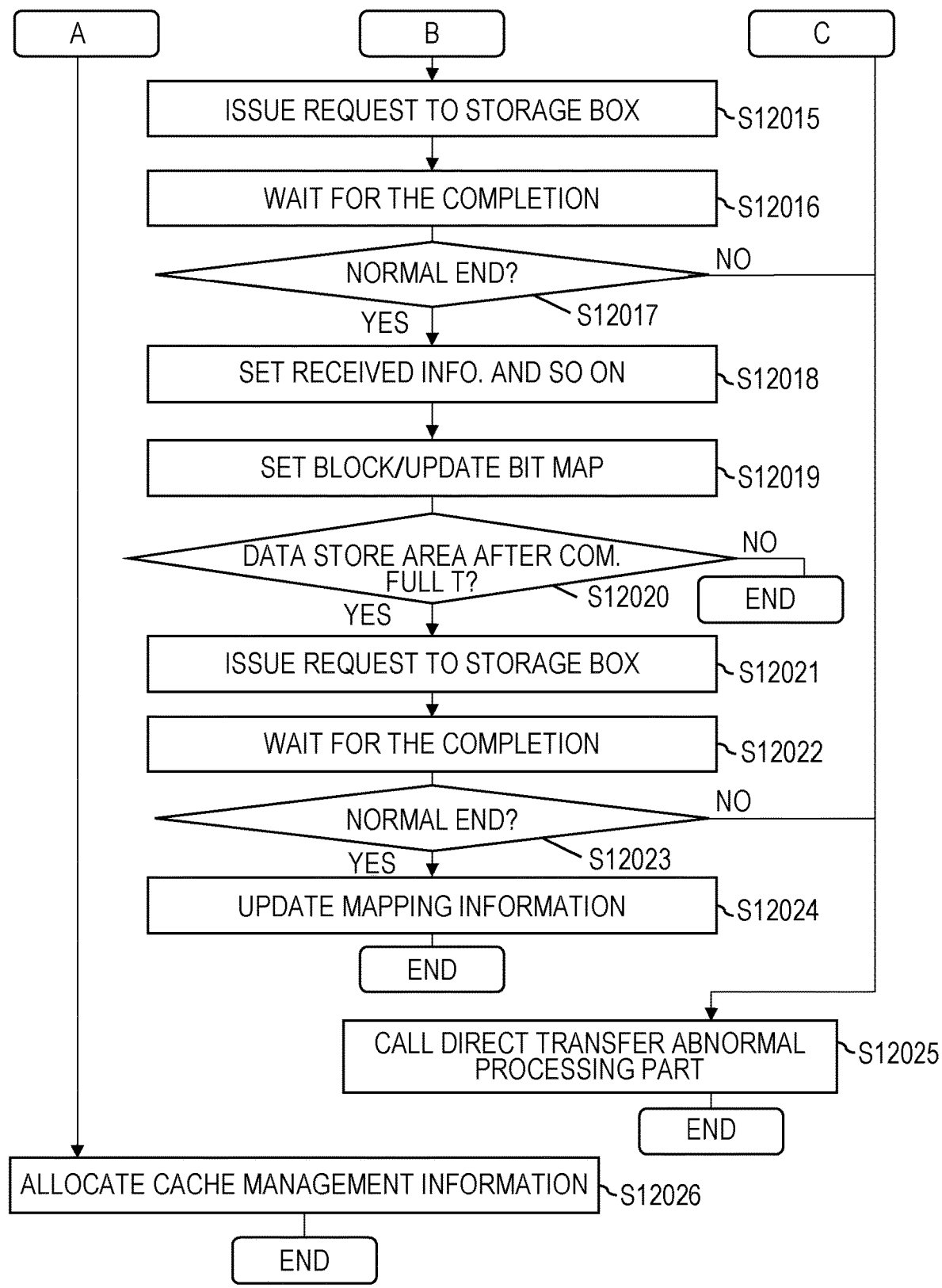
FIG. 31B is a view illustrating a processing flow of the write request receive part according to the second embodiment.

FIGS. 31A and 31B are processing flows of a write request receive part 4100 of the second embodiment. The write request receive part 4100 is executed when the storage controller 200 receives a write request from the server 110.

Step S12000: The processor 260 converts a virtual logical volume specified by the received write request into a logical volume according to the virtual logical volume information 2085.

Step S12001: It is checked whether the logical volume direct transfer stop flag 2030 is turned on. In this case, the direct transfer is stopped, and thus, the processing jumps to Step S12026.

Step S12002: It is checked whether the cache management information 2750 is allocated to a specified area to which write is performed. If allocated, the processing jumps to Step S12004.

Step S12003: If not allocated, the cache management information 2750 is allocated to the area. Here, the cache management information 2750 is allocated from the empty cache management information pointer 2650 to the first cache management information pointer 2022 and the second cache management information pointer 2023 in the area corresponding to the parity group. Then, the direct transfer flag 2757 of each piece of cache management information 2750 is turned on. The block bit map 2753, the update bit map 2754, and the unaccessible bit map 2755 are all cleared. Note that the allocation is stopped if slot management information in an empty state and unused temporary write areas are insufficient, the direct transfer is not executed, the conventional processing is executed. Thereafter, the processing jumps to Step S12005.

Step S12004: Any location where the area for write is currently stored is checked by referring to the mapping information (mapping address) 2004. If stored in the real page, the corresponding page invalid bit map 2104 of the corresponding real page information 2100 is turned on. In the case of existence of the storage area before compression, the corresponding invalid bits of the first invalid bit map before compression 2020 and the second invalid bit map before compression 2021 are turned on. In the case of existence of the storage area after compression, the corresponding invalid bits of the first invalid bit map after compression 2011 and the second invalid bit map after compression 2012 are turned on. If the mapping information (mapping address) 2004 is null, no particular processing is performed.

Step S12005: Here, the update bit map 2754 and the block bit map 2753 corresponding to the specified address are turned on. Further, the addresses indicated by the first writing pointer before compression 2013 and the second writing pointer before compression 2014 are set in the mapping information (mapping address) 2004.

Step S12006: In this step, the storage box 130 is instructed to perform the direct transfer. At this time, as the address at which the write data is written, the two addresses indicated by the first writing pointer before compression 2013 and the second writing pointer before compression 2014 are specified as addresses for temporary write. Since the data is written in the log structure stream in the second example, pieces of data at different addresses of the logical volume are written in the storage area before compression. In the second embodiment, the logical volume identifier and the relative address (offset in the real page) where the write has occurred are sent to the storage box 130. It is a matter of course that the present invention is advantageous even if the logical volume identifier and the relative address where the write has occurred are not transmitted to the storage box 130.

Step S12007: The processing waits for the completion.

Step S12008: Either normal end or abnormal end is determined. In the case of abnormal end, the processing jumps to Step S12025 to stop the direct transfer. Note that the case of the abnormal end includes the case where there is no completion report from the storage box 130 even after a lapse of a certain period of time and the time is up under the time monitoring of the storage controller 200.

Step S12009: The hash value received from the storage box 130 is set to the corresponding hash value 2019. Further, the first writing pointer before compression 2013 and the second writing pointer before compression 2014 are updated.

Step S12010: Normal end is reported to the server 110.

Step S12011: It is checked whether the write in the entire first storage area before compression has been completed. If not completed, the processing is completed.

Step S12012: If completed, it is checked whether the corresponding cache management information 2750 is allocated to the relative address of the real page indicated by the log structure writing pointer 2006. If allocated, the processing jumps to Step S12014.

Step S12013: If not allocated, the cache management information is allocated. If allocated, the block bit map 2753, the update bit map 2754, and the unaccessible bit map 2755 are all cleared.

Step S12014: In the second embodiment, when the write of the entire first storage area before compression is completed, a relative address of a logical volume of data that has been stored in the first storage area before compression is sent from the storage box 130. Here, the deduplication preprocessing part 4800 is called using the relative address of the logical volume of the data stored in the first storage area before compression as a parameter.

FIG. 31B will be described.

Step S12015: The following process is executed after completion of processing. The relative address of the logical volume of each deduplication unit and information indicating the possibility of deduplication of the unit are sent to the storage box 130. If the deduplication is possible, an address from which data needs to be read and checked is notified. Further, data that has not been deduplicated, and instructed to be stored from the addresses indicated by the first writing pointer after compression 2015 and the second writing pointer after compression 2016.

Step S12016: The processing waits for the completion.

Step S12017: Either normal end or abnormal end is determined. In the case of the abnormal end, the processing jumps to Step S12025 in order to execute processing to stop the direct transfer. Note that the case of the abnormal end includes the case where there is no completion report from the storage box 130 even after a lapse of a certain period of time and the time is up under the time monitoring of the storage controller 200.

Step S12018: A length of the data received from the storage box 130 is set to the corresponding data length after compression 2018. An address storing the same data is set to the mapping information (mapping address) 2004 corresponding to the deduplicated data. In addition, for the data that has not been deduplicated, addresses of the first data storage area pointer after compression 2009 and the second data storage area after compression 2012 that have stored this data, received from the storage box 130, are set in the corresponding mapping information (mapping address) 2004. Further, the update bit map 2754 and the block bit map 2753 of the cache management information allocated to the relative address of the logical volume corresponding to the compressed data are turned off. If all the update bit maps 2754 and the block bit maps 2753 of the cache management information are turned off, the cache management information 2750 is returned to the empty cache management information pointer 2650.

Step S12019: The corresponding block bit map 2753 and update bit map 2754 of the cache management information 2750 allocated to the real page corresponding to the compressed data are turned on.

Step S12020: It is checked whether the first data storage area pointer after compression 2009 has become full (the length of the stored data has reached a parity group length). If not, the processing is ended.

Step S12021: If being full, the storage box 130 is instructed to generate a parity and write the data and the generated parity to the storage unit from the area indicated by the log structure writing pointer 2006.

Step S12022: The processing waits for the completion.

Step S12023: Either normal end or abnormal end is determined. In the case of the abnormal end, the processing jumps to Step S12025 in order to execute processing to stop the direct transfer. Note that the case of the abnormal end includes the case where there is no completion report from the storage box 130 even after a lapse of a certain period of time and the time is up under the time monitoring of the storage controller 200.

Step S12024: The real page storing the compressed data and the relative address are stored in the corresponding mapping information 2004. Here, the cache management information 2750 allocated to the parity group is released. Specifically, the cache management information 2750 other than the last cache management information 2750 is returned to the empty cache management information queue 2650. The bit map information such as the block bit map 2753 of the cache management information 2750 returned to the queue, and the flag information are all turned off. Thereafter, the processing is ended.

Step S12025: Since abnormal processing has occurred, direct transfer abnormal processing is called to execute the post-processing of the direct transfer. Thereafter, the processing is ended.

Step S12026: A process of receiving write data in the cache starts. Since this process is a known technique, details thereof will not be described. After the end, the processing is completed.

Figure 32:
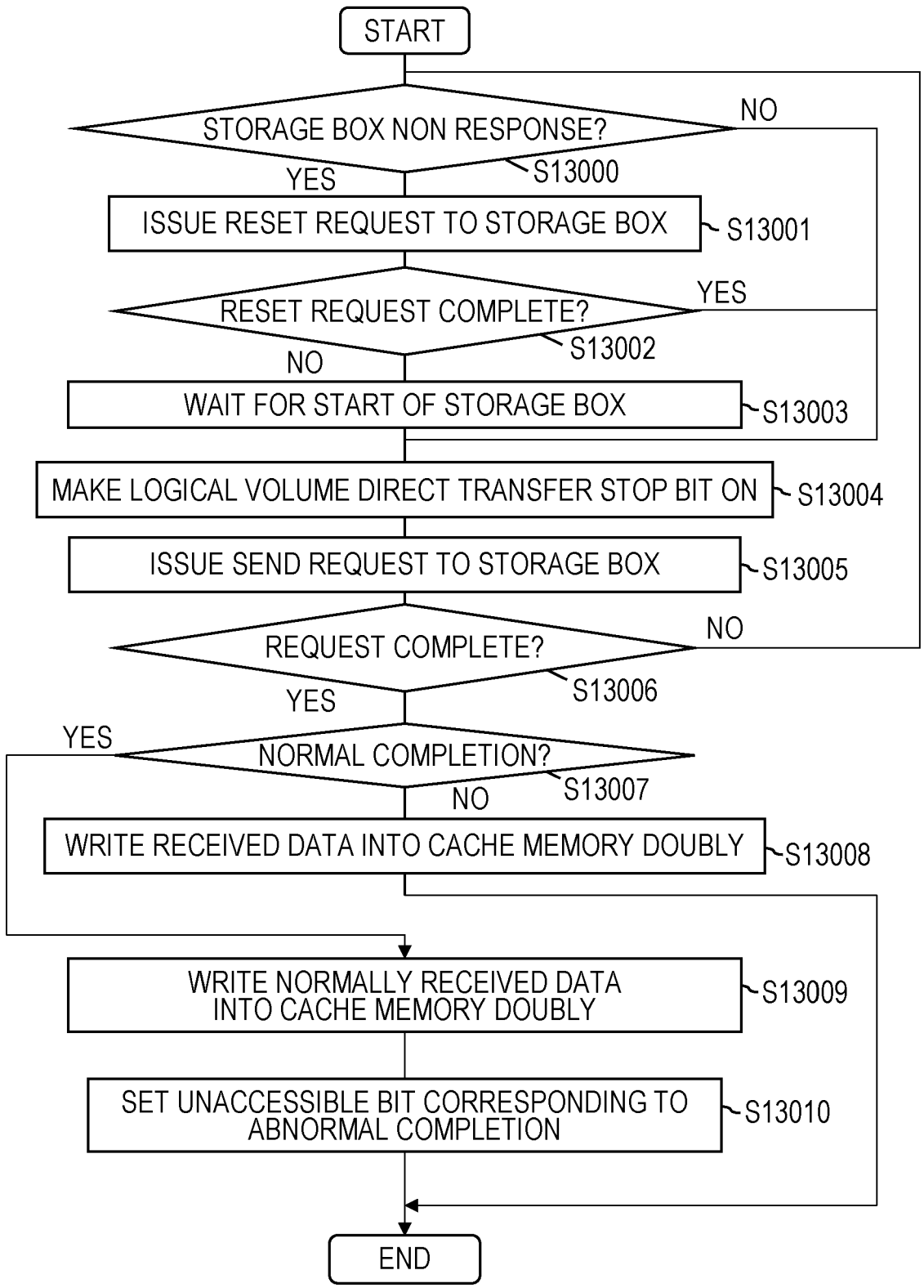
FIG. 32 is a view illustrating a processing flow of a write abnormal end corresponding part according to the second embodiment.

FIG. 32 is a processing flow of the write abnormal end corresponding part 4200 of the second embodiment. This processing is also processing that is appropriately executed by the processor 260.

Step S13000: It is checked whether the storage box 130 is abnormally ended with no response. If the processing has not ended with no response, the processing jumps to Step S13004.

Step S13001: If the processing is ended with no response, the storage box 130 is likely to be incapable of communicating due to power-down or the like. In this step, a reset request is issued to the storage box once.

Step S13002: If the reset request is completed, the processing jumps to Step S13004.

Step S13003: Since there is a cause such as power-down of the storage box 130, contact is made with a storage manager, maintenance personnel, or the like, and the processing waits until the storage box 130 starts up. After the starting-up, the execution is started from Step S13004.

Step S13004: The logical volume direct transfer stop flag 2030 corresponding to the log structure stream is turned on.

Step S13005: The storage box 130 is notified of addresses indicated by m first data storage area pointers before compression 2007, m second data storage area pointers before compression 2008, two first data storage area pointers after compression 2009, and two second data storage area pointers after compression 2010, and the first invalid bit map before compression 2020, the second invalid bit map before compression 2021, the first invalid bit map after compression 2011, and the second invalid bit map after compression 2012 which correspond to each storage area, and is instructed to send data stored in an area where an invalid bit is turned off and an address of a logical volume thereof to the storage controller 200.

Note that the storage box 130 is instructed to transfer the data received from the server 110 in the second embodiment, but may be instructed to receive a parity from the storage box 130 and store the parity in the cache 210 when the storage box 130 has already generated the parity.

Step S13006: The processing waits for the completion. If the completion is not reported within a certain period of time, the processing jumps to Step S13000.

Step S13007: If the transfer of some data fails, the processing jumps to Step S13008.

Step S13008: When the transfer of the entire data is normally ended, the following process is executed. Data received from a first data storage area before compression or a second data storage area before compression is written doubly in an area of the cache 210 corresponding to the corresponding slot management information 2705 allocated to a space of a logical volume based on a relative address of the corresponding logical volume. In addition, data received from a first data storage area after compression or a second data storage area after compression is written doubly in an area of the cache 210 corresponding to the corresponding slot management information 2705 allocated to a space on a real page. Thereafter, the processing is ended.

Step S13009: Only the successfully transferred data is written doubly in the area corresponding to the cache management information 2750.

Step S1310: The unaccessible bit map 2755 corresponding to the data whose transfer has failed is turned on.

When the unaccessible bit map 2755 corresponding to the parity group is not turned on (when all the pieces of data has been normally stored in the cache 210), the storage controller 200 can generate a parity and write the data and the parity to the storage unit 160.

In the case of a slot having a bit with the unaccessible bit map 2755 in the on state, a new write request is made for an area corresponding to this unaccessible bit map 2755 in the on state, and the corresponding unaccessible bit map 2755 can be turned off if the data can be normally stored in the cache 210. If the old data destroy flag 2759 is turned off in a case where all the unaccessible bit maps 2755 are turned off in the cache management information 2750 corresponding to the slot, the storage controller 200 can read old data and an old parity in the cache 210, and apply the logic for generating a parity from these pieces of data and storing the data and the parity in the storage unit 160.

When the old data destroy flag 2759 is turned on, it is difficult to use the old data for the parity generation. Thus, when all the unaccessible bit maps 2755 of all pieces of the cache management information 2750 corresponding to the parity group are turned off, the storage controller 200 can read the remaining data of the parity group in the cache 210, generates a parity, and write the data of the entire parity group and the parity in the storage unit 160.

Figure 33:
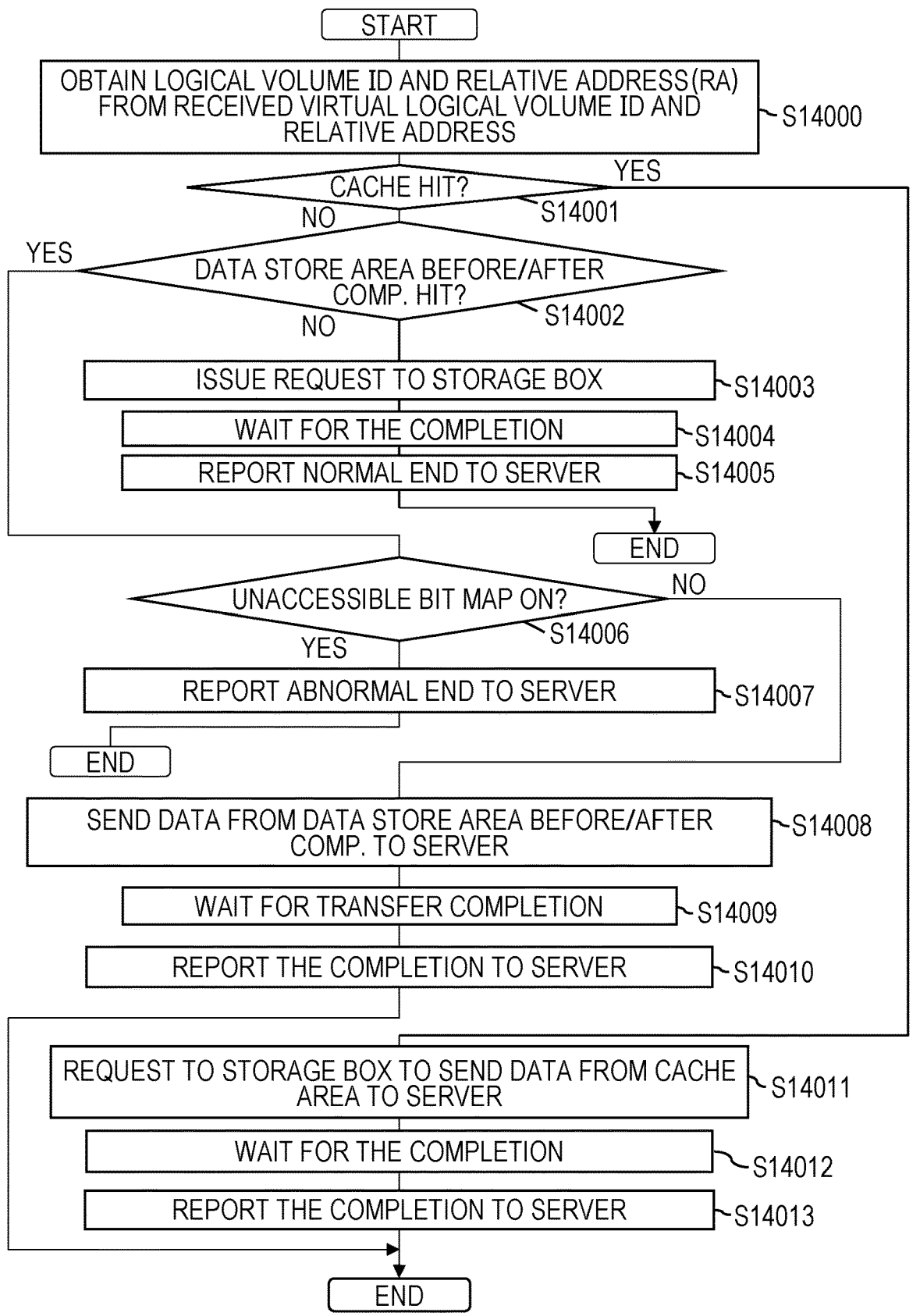
FIG. 33 is a view illustrating a processing flow of a read process execution part according to the second embodiment.

FIG. 33 is a processing flow of the read process execution part 4300 of the second embodiment. In the second embodiment, requested data is directly transferred from the storage box 130 to the server. It is a matter of course that the present invention is advantageous even if the data specified by the read request is transmitted from the storage box 130 to the server via the storage controller 200.

Step S14000: The processor 260 converts a virtual logical volume specified by the received read request into a logical volume according to the virtual logical volume information 2085, and acquires the corresponding logical volume information 2000.

Step S14001: It is checked, based on an address of received read request, whether data, specified by the request with the mapping information (mapping address) 2004, the cache management information pointer 2022, the real page information 2100, the block bit map 2753 of the cache management information 2750, and the like, hits the cache 210. If being missed, the processing jumps to Step S14002. If being hit, the processing jumps to Step S14011.

Step S14002: It is checked whether the data is stored in the data storage area before compression or the data storage area after compression by referring to the mapping information (mapping address) 2004. If so, the processing jumps to Step S14006.

Step S14003: An address on a real page stored in the mapping information (mapping address) 2004 is specified, and the storage box 130 is instructed to send the stored data to the server 110.

Step S14004: The processing waits for the completion.

Step S14005: A completion report is sent to the server 110 to end the processing.

Step S14006: It is checked whether a bit of the unaccessible bit map 2755 corresponding to the requested data is turned on. If turned off, the processing jumps to Step S14008.

Step S14007: An abnormality that the data is unaccessible is reported to the server 110. This post-processing is ended.

Step S14008: The storage box 130 is instructed to send data to the server 110 from two addresses of the first data storage area before compression and the second data storage area before compression indicated in the mapping information, or two addresses of the first data storage area after compression and the second data storage area after compression.

Step S14009: The processing waits for the completion.

Step S14010: A completion report is sent to the server 110 to end the processing.

Step S14011: The requested data is transferred from the cache to the server.

Step S14012: The processing waits for the completion of transfer.

Step S14013: A completion report is sent to the server 110 to end the processing.

Figure 34:
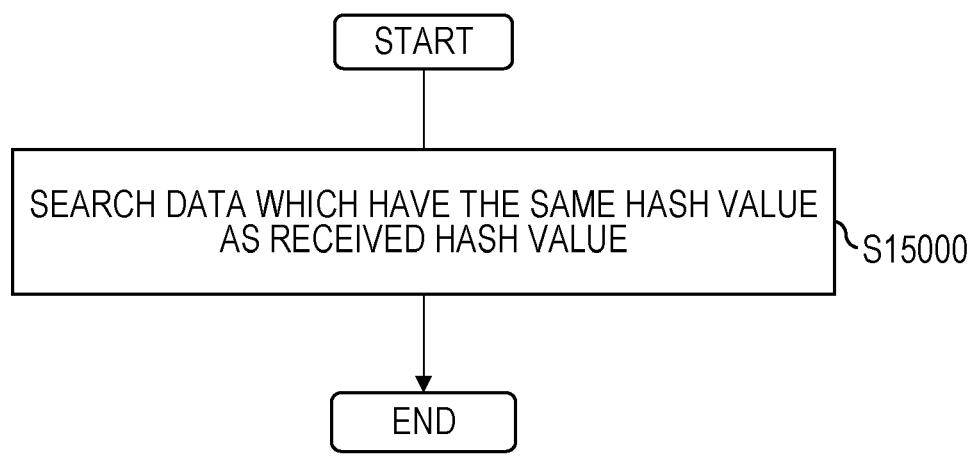
FIG. 34 is a view illustrating a processing flow of a deduplication processing execution part according to the second embodiment.

FIG. 34 is a processing flow of the deduplication preprocessing part 4800. A deduplication process is a function of reducing the capacity by preventing storage of data having exactly the same content. The following steps are taken to efficiently perform the deduplication process. (1) A hash value of data is obtained to find a set of pieces of data having the same hash value. (2) For pieces of data having the same hash value, the data itself is used for comparison, and the data is not stored if there is data matching with the data. In the second embodiment, (1) is realized by the storage controller and (2) is realized by the storage box. The deduplication preprocessing part 4800 executes the processing of (1). This processing itself is well known, and thus, will be briefly described.

Step S15000: Data having the same hash value as a hash value of data stored in the first data storage area before compression in the full state is searched for by referring to a mapping table. When the respective pieces of data have the same hash value, a set of addresses where these pieces of data are stored is acquired. The above process is executed to complete the processing.

Next, a description will be given regarding an operation executed by the box processor 170 of the storage box 130 according to an instruction of the storage controller 200. Programs to be executed are stored in the box memory 181.

Figure 35:
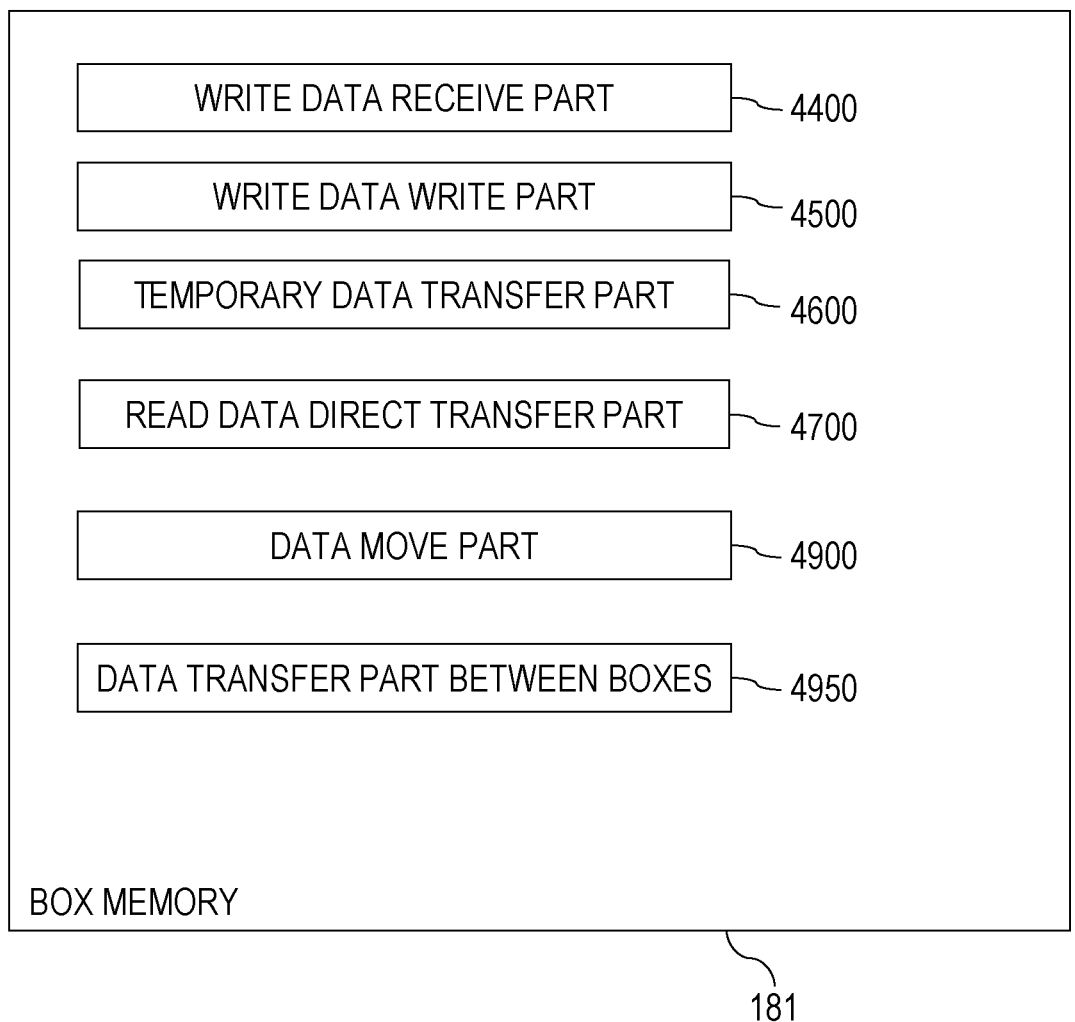
FIG. 35 is a diagram illustrating a configuration of a program executed by a storage box according to the second embodiment.

FIG. 35 illustrates programs related to the second embodiment and stored in the box memory 181. The programs related to the second embodiment include a data move part 4900 and a data transfer part between boxes 4950 in addition to those of the first embodiment.

Figure 36:
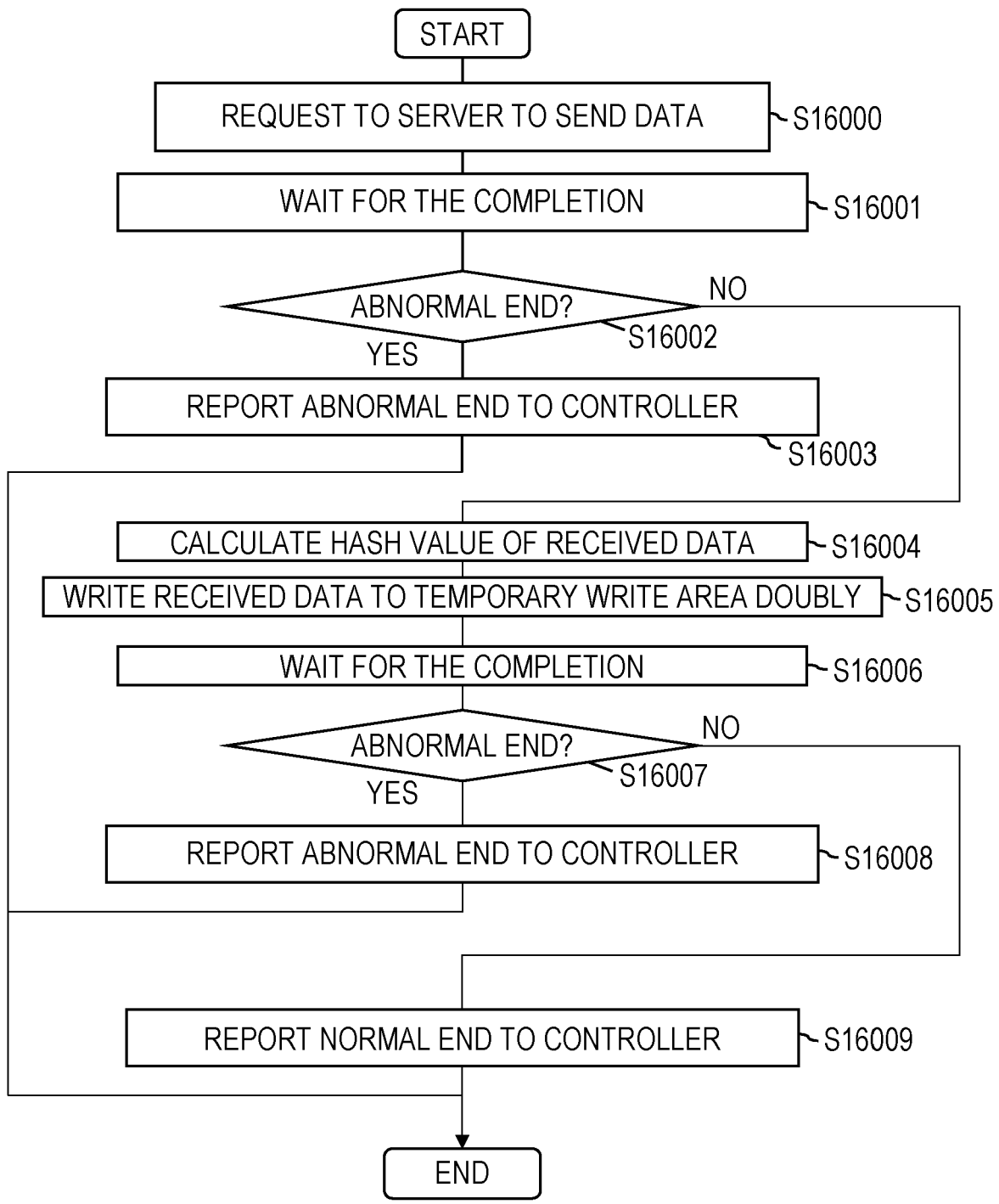
FIG. 36 is a view illustrating a processing flow of a data move part according to the second embodiment.

FIG. 36 is a processing flow of the write data receive part 4400 according to the second embodiment. The write data receive part 4400 performs a process of receiving write data from the server 110 and writing the data in a temporary write area according to an instruction from the storage controller 200.

Step S16000: The server 110 is instructed to send data.

Step S16001: The processing waits for the completion of transfer.

Step S16002: In the case of normal end, the processing jumps to Step S16004.

Step S16003: An abnormal end report is returned to the storage controller to end the processing.

Step S16004: A hash value of the received write data is calculated.

Step S16005: The data is written to addresses of two temporary write areas specified by the storage controller 200.

Step S16006: The processing waits for the completion of write.

Step S16007: In the case of normal end, the processing jumps to Step S16009.

Step S16008: An abnormal end report is returned to the storage controller to end the processing.

Step S16009: The hash value and a normal end report are returned to the storage controller to end the processing.

Figure 37:
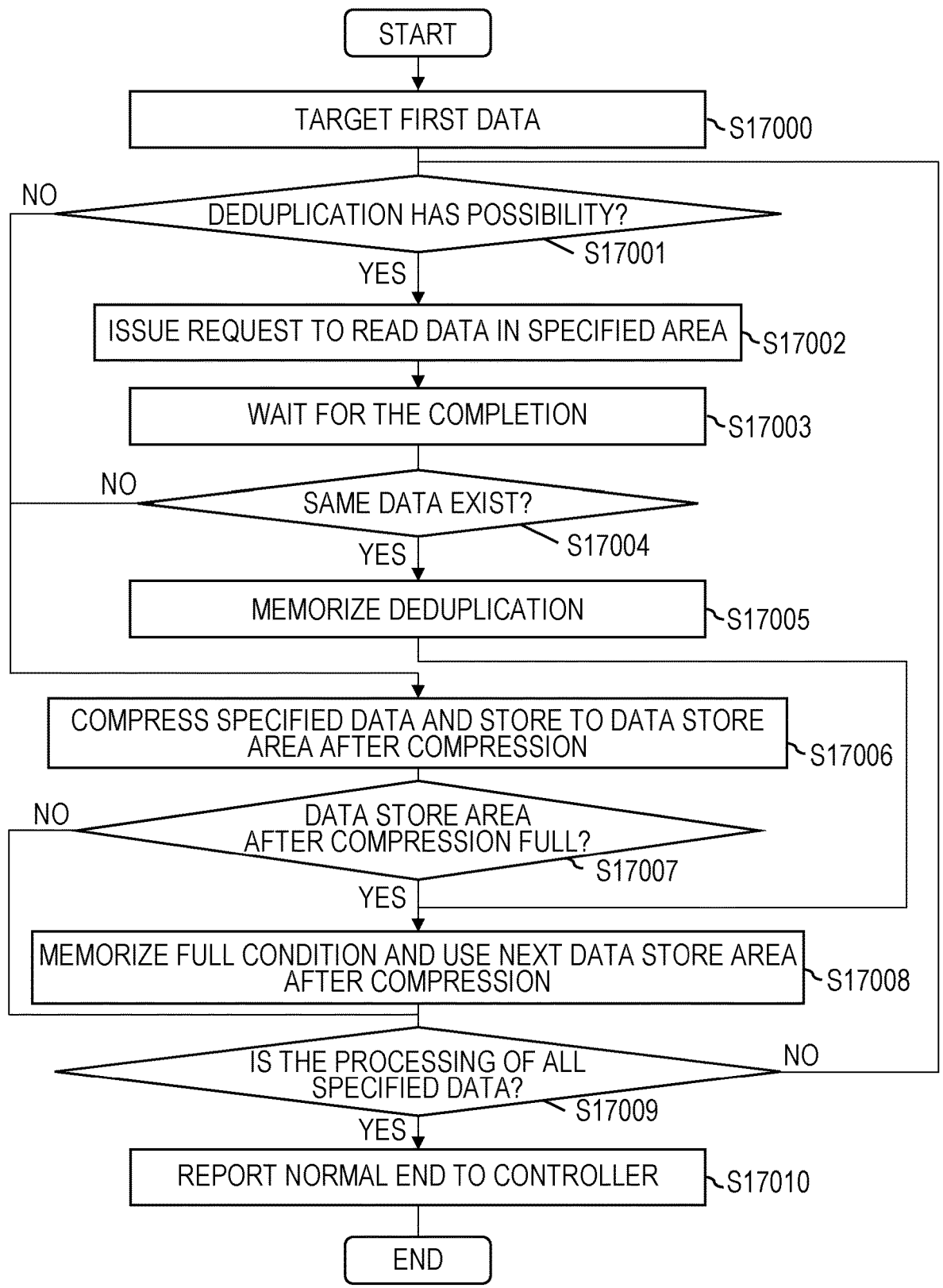
FIG. 37 is a view illustrating a processing flow of a write data receive part according to the second embodiment.

FIG. 37 is a processing flow of the data move part 4900 according to the second embodiment. The data move part first executes a process related to the part (2) of the deduplication process. Specifically, data at the address of the data having the same hash value received from the storage controller is read and it is checked whether the contents match with each other. If there is no match, a compression process is performed, and the compressed data is stored from the specified addresses of the first data storage area after compression and the second data storage area after compression. A length of this compressed data is returned to the storage controller. If the first data storage area after compression and the second data storage area after compression are full, data is stored from heads of the next first data storage area after compression and second data storage area after compression. When the first data storage area after compression and the second data storage area after compression are full again, this is reported to the storage controller.

Step S17000: First data is set as a target of execution.

Step S17001: It is checked whether the target data is data for which deduplication is possible. Specifically, it is checked whether there is data having the same hash value. If there is no data having the same hash value, the processing jumps to Step S17006.

Step S17002: A request for reading data corresponding to a specified address is issued. In this case, when a plurality of addresses are specified, a plurality of read requests are issued in parallel. If the specified address is the storage unit 160 of the storage box 130, a request is issued by specifying an address of an area to be read to the storage. If the specified address is not the storage unit 160 of the storage box 130, a request is issued to the storage box 130 including the storage unit.

Step S17003: The processing waits for the completion of the request.

Step S17004: It is checked whether there is data matching with the data among pieces of read data. If there is no match, the processing jumps to Step S17006.

Step S17005: A fact that the data has been deduplicated is stored. Thereafter, the processing jumps to Step S17008.

Step S17006: The handled data is compressed and stored in the first data storage area after compression and the second data storage area after compression.

Step S17007: It is checked whether the first data storage area after compression and the second data storage area after compression are full. If the both are not full, the processing jumps to Step S17009.

Step S17008: If the both become full, this fact is stored, and the next first data storage area after compression and second data storage area after compression are used.

Step S17009: It is checked whether processing on all pieces of data in the specified first data storage area before compression and second data storage area before compression has been executed. If not executed, data in the next first data storage area before compression and second data in the second data storage area before compression is set as a target of execution, and the processing jumps to Step S17001.

Step S17010: The controller is notified of a completion report. At this time, an address of the data that has been deduplicated is notified. When the first data storage area after compression and the second data storage area after compression become full, this fact is reported.

Figure 38:
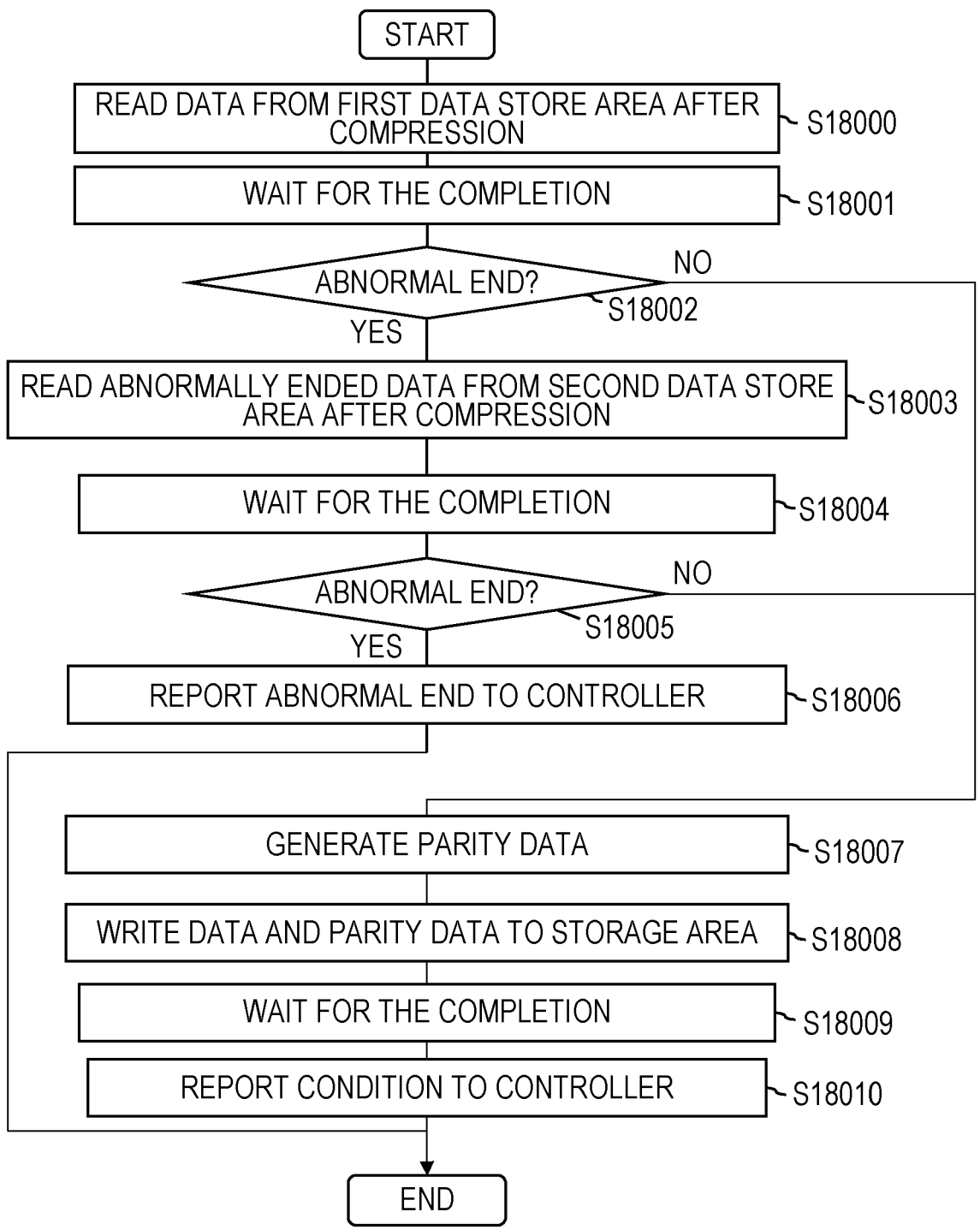
FIG. 38 is a view illustrating a processing flow of a write data write part according to the second embodiment.

FIG. 38 is a processing flow of the write data write part 4500 in the second embodiment. The write data write part 4500 reads write data from the first data storage area after compression and the second data storage area after compression according to an instruction of the storage controller 200, generates a parity, and writes the write data and the parity from the storage controller 200 to a specified area of the storage unit 160.

Step S18000: Data is read from one of two first data storage area after compressions and second data storage area after compression specified by the storage controller 200.

Step S18001: The processing waits for the completion of processing.

Step S18002: It is checked whether read of all pieces of data has been normally ended. In the case of normal end, the processing jumps to Step S18005.

Step S18003: Only the abnormally ended data is read from the other data storage area after compression.

Step S18004: The processing waits for the completion.

Step S18005: It is checked whether read of all pieces of specified data has been normally ended, and the processing jumps to Step S18007 in the case of normal end.

Step S18006: The abnormal end is reported to the storage controller 200 to complete the processing.

Step S18007: A parity is generated from the read write data.

Step S18008: The write data and the parity are written in an area of the storage unit 160 specified by the storage controller 200.

Step S18009: The processing waits for the completion.

Step S18010: A normal end report is sent to the storage controller 200 when the write of all pieces of data is normally ended, and an abnormal end report is sent to the storage controller 200 when the write of at least one piece of data is abnormally ended.

Figure 39:
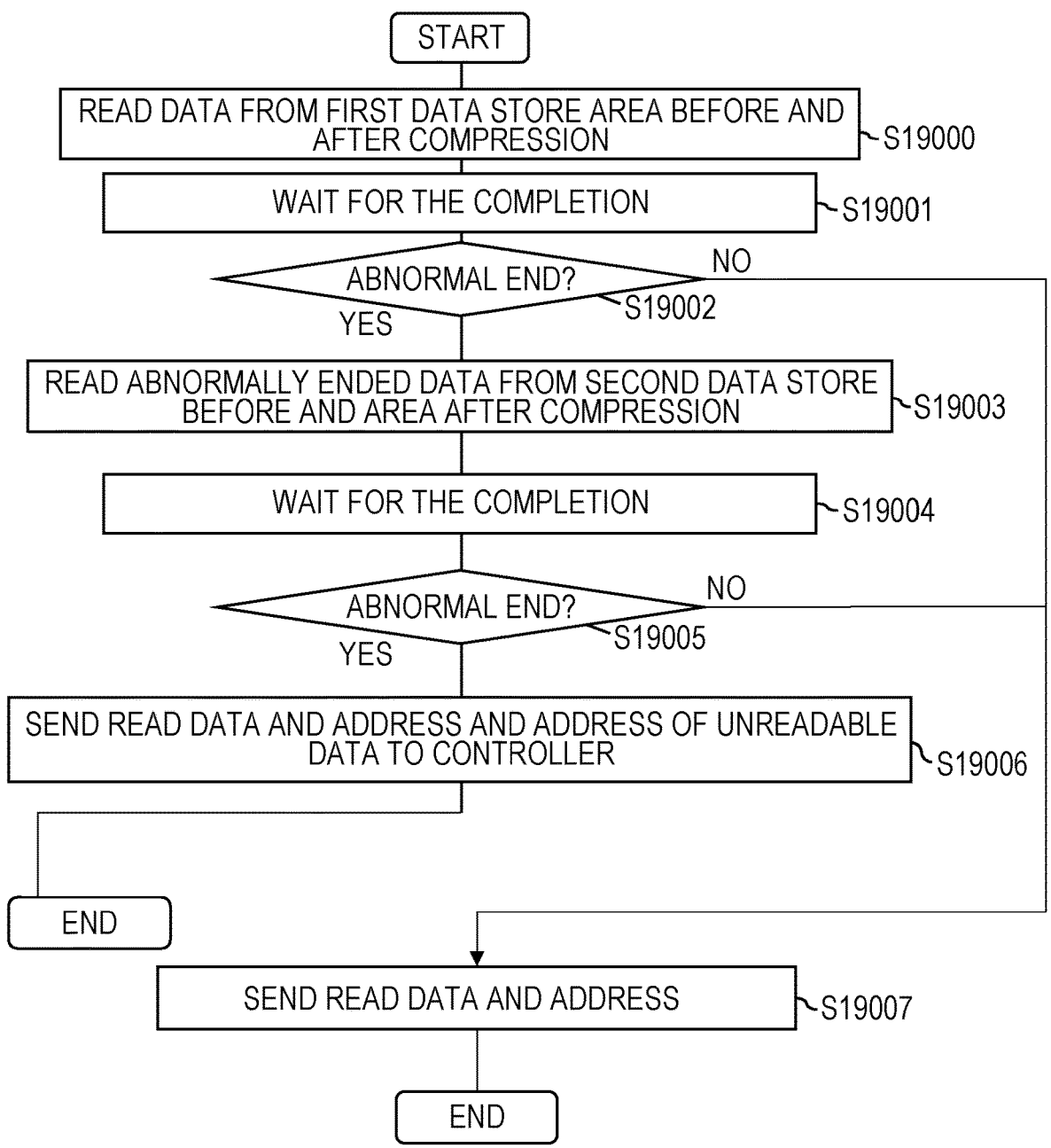
FIG. 39 is a view illustrating a processing flow of a temporary data transfer part according to the second embodiment.

FIG. 39 is a processing flow of the temporary data transfer part 4600 according to the second embodiment. The temporary data transfer part 4600 reads data from the first data storage area before compression, the second data storage area before compression, the first data storage area after compression, and the second data storage area after compression according to an instruction of the storage controller 200, and transfers the data to the storage controller 200.

Step S19000: A request for reading data is issued to the corresponding storage unit in order to read the data in the first data storage area before compression and the first data storage area after compression specified by the storage controller 200.

Step S19001: The processing waits for the completion of the request.

Step S19002: It is checked whether all pieces of data have been normally read. If all the pieces of data have been read, the processing jumps to Step S19007.

Step S19003: A request for reading data is issued from the corresponding storage unit in order to read the data from the second data storage area before compression and the second data storage area after compression which store the same data as unreadable data.

Step S19004: The processing waits for the completion of the request.

Step S19005: It is checked whether all pieces of data have been normally read. If all the pieces of data have been read, the processing jumps to Step S19007.

Step S19006: All pieces of normally read data and addresses thereof are sent to the storage controller 200. For the unreadable data, the storage controller 200 is notified of the failure in reading and an address of the unreadable data. Then, the processing is completed.

Step S19007: Since all pieces of data has been read, the data and the address thereof are sent to the storage controller 200. Thereafter, the processing is ended.

Figure 40:
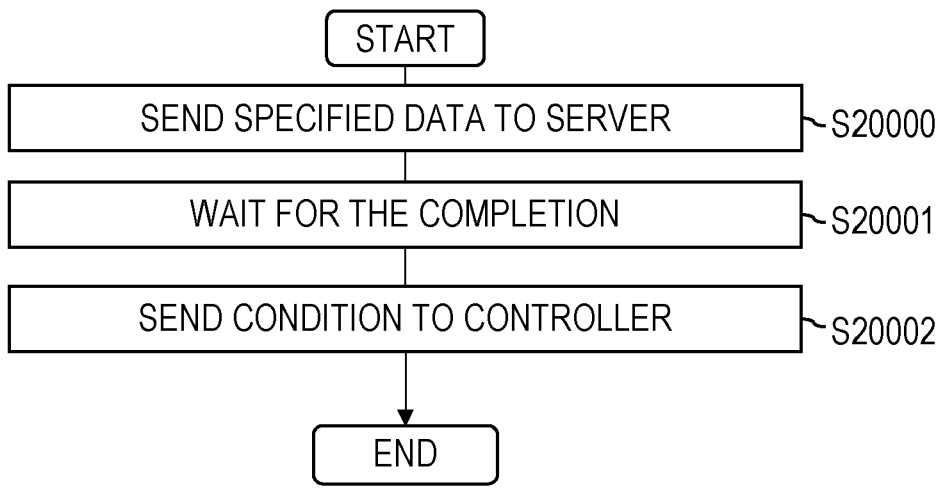
FIG. 40 is a view illustrating a processing flow of a read data direct transfer part according to the second embodiment.

FIG. 40 is a processing flow of the read data direct transfer part 4700 according to the second embodiment. The read data direct transfer part 4700 performs a process of sending specified data to the server 110 according to an instruction from the storage controller 200. In the second embodiment, the storage controller 200 manages the data storage area before compression and the data storage area after compression, and thus, the storage box 130 does not recognize the distinction between the area in which the data read/written by the server 110 is permanently stored or the temporary write area for creation of the parity. Therefore, the storage box 130 only sends the data of the specified area regardless of the area in which the data read/written by the server 110 is permanently stored or the temporary write area for creation of the parity. As above, the process of sending the data of the area in which the data read/written by the server 110 is permanently stored and the process of sending the data of the temporary write area for creation of the parity have the same processing flow, and both the processes are executed by the read data direct transfer part 4700.

Step S20000: The data of the specified area is sent to the server 110.

Step S20001: The processing waits for the completion of processing.

Step S20002: A normal end report is returned to the storage controller 200 in the case of normal end, and an abnormal end report is returned to the storage controller 200 in the case of abnormal end. Thereafter, the processing is ended.

Figure 41:
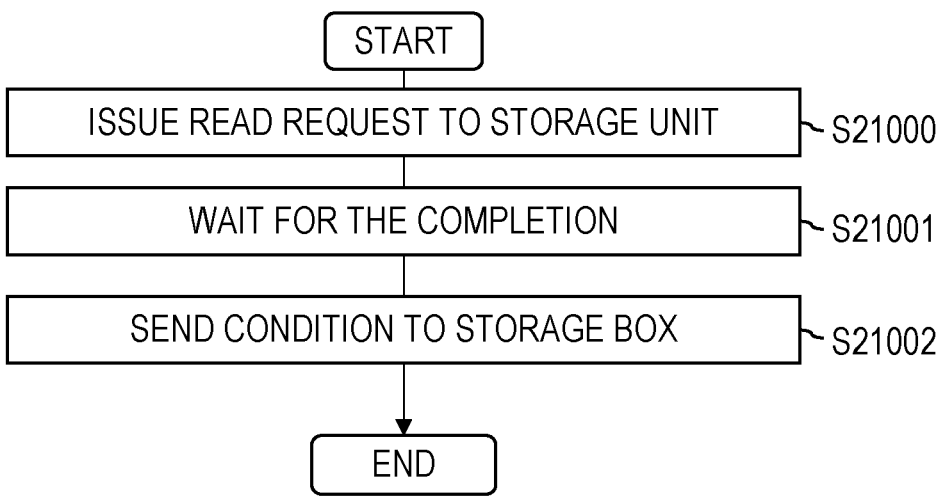
FIG. 41 is a view illustrating a processing flow of a data transfer part between boxes according to the second embodiment.

FIG. 41 is a processing flow of the data transfer part between boxes 4950 according to the second embodiment. The data transfer part between boxes 4950 is a processing flow executed at the time of sending requested data from the other storage box 130.

Step S21000: A request is issued to the storage unit 160 to read data from a specified address of the storage unit 160.

Step S21001: The processing waits for the completion.

Step S22001: The read data is transmitted to the storage box 130 that has received the read request. After completion, the processing is ended.

The present invention can apply various types of processing to correspond to a failure of the storage controller by storing the written data in the cache of the storage controller when the failure occurs in the case where data is written from the server to the storage box under the environment in which the server, the storage controller, and the storage box are connected via the network.

What is claimed is:

1. A complex system comprising;
one or more storage systems including a cache and a storage controller; and
a storage box including a storage medium,
wherein the storage box:
when redundant data from write data received from a server can be generated by the storage box, generates the redundant data from the write data received from the server;
when the storage box can write the write data and the redundant data to the storage medium, writes the write data and the redundant data to the storage medium; and
transmits the write data to the one or more storage systems when the storage box cannot generate the redundant data or cannot write the write data and the redundant data to the storage medium; and
the one or more storage systems stores the received write data in the cache.

2. The complex system according to claim 1, wherein
when data that is not transmittable to the one or more storage systems exists in the write data, the storage box notifies the one or more storage systems of the existence and an address of an area specified to write the data, and
the one or more storage systems stores the area specified to write the data.

3. The complex system according to claim 2, wherein the storage controller abnormally ends a read request when the read request is received from the server for the stored area.

4. The complex system according to claim 1, wherein the storage box transmits the write data to the one or more storage systems when the storage box cannot generate the redundant data.

5. The complex system according to claim 1, wherein the storage box transmits the write data to the storage controller when the storage box cannot write the write data and the redundant data in an area specified to be written in the storage medium.

6. The complex system according to claim 1, wherein the one or more storage systems:
receives a write request specifying write areas from the server;
determines whether the specified write areas are sequential; and
instructs the storage box to receive write data from the server when the write areas are sequential.

7. The complex system according to claim 1, wherein the one or more storage systems:
receives a write request specifying a write area from the server;

performs control such that data written by the write request is written in a log structure format; and instructs the storage box to receive the data written by the write request.

8. The complex system according to claim 7, wherein the storage box calculates a hash value of the received write data, and transmits an identifier of the write data corresponding to the hash value to the storage system, and the one or more storage systems stores the hash value and the corresponding identifier of the write data.

9. The complex system according to claim 8, wherein the storage system:

compares the received hash value with stored hash values; and notifies the storage box of non-existence and the write data identifier when data having a hash value matching with the received hash value does not exist, and notifies the storage box of the write data identifier and an address of an area storing data having a hash value matching with the received hash value when there is the data having the hash value matching with the received hash value.

10. The complex system according to claim 9, wherein the storage box:

reads specified area data when data having a hash value matching with the received hash value exists, and checks whether the read area data has a value matching with a value of write data; and generates redundant data using write data for which there is no data having a matching hash value and write data that does not match with the read area data although there is data having a matching hash value, and writes the write data and the redundant data to the one or more storage systems, and when the read area data and the write data match with each other, the one or more storage systems is notified of the match, the write data identifier, and the read area, and the one or more storage systems stores the notified write data identifier and read area.

11. The complex system according to claim 10, wherein the storage box compresses write data for which there is no data having a matching hash value and write data that does not match with the read area data although there is data having a matching hash value, generates redundant data from compressed data, and writes the compressed data and the redundant data to the one or more storage systems.

12. The complex system according to claim 1, wherein the storage box compresses the write data, generates redundant data from the compressed data, and writes the compressed data and the redundant data to the one or more storage systems.

13. The complex system according to claim 1, wherein the complex system transmits a completion report to the server when the storage box receives the write data, and the storage box performs generating the redundant data and writing the write data and the redundant data to the storage medium after the transmission of the completion report.

14. The complex system according to claim 13, wherein the one or more storage systems:

determines a destination of the write data based on a write request that specifies a write area and is received by the server, and transmits the destination to the server;

receives the write data from the server and stores the write data in the cache when determining that the destination is the storage controller; and transmits an instruction to receive the write data from the server, an address specified by the server, and an address for storing the received write data to the storage box when the destination is the storage box.

15. A data transfer method in a complex system including: one or more storage systems including a cache and a storage controller; and a storage box including a storage medium, wherein the storage box:

when redundant data can be generated from write data received from a server by the storage box, generates the redundant data from the write data received from the server;

when the storage box can write the write data and the redundant data to the storage medium, writes the write data and the redundant data to the storage medium; and transmits the write data to the one or more storage systems when the storage box cannot generate the redundant data or cannot write the write data and the redundant data to the storage medium, and the one or more storage systems stores the received write data in the cache.

* * * * *